US008680425B2

(12) United States Patent
Twarog et al.

(10) Patent No.: US 8,680,425 B2
(45) **Date of Patent: *Mar. 25, 2014**

(54) PLASMA ARC TORCH HAVING AN ELECTRODE WITH INTERNAL PASSAGES

(75) Inventors: Peter J. Twarog, West Lebanon, NH (US); Charles Marcou Hackett, Hanover, NH (US); David Jonathan Cook, Bradford, VT (US); Bruce Peter Altobelli, Etna, NH (US); David L. Bouthillier, Hartford, VT (US)

(73) Assignee: Hypertherm, Inc., Hanover, NH (US)

( * ) Notice: Subject to any disclaimer, the term of this patent is extended or adjusted under 35 U.S.C. 154(b) by 977 days.

This patent is subject to a terminal disclaimer.

(21) Appl. No.: 12/101,909

(22) Filed: Apr. 11, 2008

(65) Prior Publication Data

US 2008/0237202 A1 Oct. 2, 2008

Related U.S. Application Data

(63) Continuation of application No. 11/223,268, filed on Sep. 9, 2005, now Pat. No. 7,375,303, which is a continuation-in-part of application No. 10/989,729, filed on Nov. 16, 2004, now Pat. No. 7,375,302.

(51) Int. Cl.
*B23K 9/00* (2006.01)
*B23K 10/00* (2006.01)

(52) U.S. Cl.
USPC ................................ 219/121.52; 219/121.48

(58) Field of Classification Search
None
See application file for complete search history.

(56) References Cited

U.S. PATENT DOCUMENTS

| | | | |
|---|---|---|---|
| 3,004,189 | A | 10/1961 | Giannini et al. |
| 3,562,486 | A | 2/1971 | Hatch et al. |
| 4,692,584 | A | 9/1987 | Caneer, Jr. |
| 4,782,210 | A | 11/1988 | Nelson et al. |
| 4,791,268 | A | 12/1988 | Sanders et al. |
| 4,902,871 | A | 2/1990 | Sanders et al. |
| 5,070,227 | A | 12/1991 | Luo et al. |
| 5,101,088 | A | 3/1992 | Andersson et al. |

(Continued)

FOREIGN PATENT DOCUMENTS

| | | |
|---|---|---|
| EP | 1154678 | 11/2001 |
| JP | 01150477 | 6/1999 |

(Continued)

OTHER PUBLICATIONS

International Search Report for PCT/US2005/039743, date of mailing Dec. 5, 2006 (25 pages).

(Continued)

*Primary Examiner* — Sang Y Paik
(74) *Attorney, Agent, or Firm* — Proskauer Rose LLP

(57) ABSTRACT

An electrode for a plasma arc cutting torch which minimizes the deposition of high emissivity material on the nozzle, reduces electrode wear, and improves cut quality. The electrode has a body having a first end, a second end in a spaced relationship relative to the first end, and an outer surface extending from the first end to the second end. The body has an end face disposed at the second end. The electrode also includes at least one passage extending from a first opening in the body to a second opening in the end face. A controller can control the electrode gas flow through the passages as a function of a plasma arc torch parameter. Methods for operating the plasma arc cutting torch with the electrode are disclosed.

18 Claims, 18 Drawing Sheets

(56) References Cited

U.S. PATENT DOCUMENTS

| | | | | |
|---|---|---|---|---|
| 5,124,525 | A | 6/1992 | Severance, Jr. et al. | |
| 5,132,512 | A | 7/1992 | Sanders et al. | |
| 5,164,568 | A | 11/1992 | Sanders | |
| 5,166,494 | A | 11/1992 | Luo et al. | |
| 5,170,033 | A | 12/1992 | Couch, Jr. et al. | |
| 5,214,262 | A | 5/1993 | Carkhuff | |
| 5,225,657 | A | 7/1993 | Blankenship et al. | |
| 5,296,668 | A | 3/1994 | Foreman et al. | |
| 5,304,770 | A | 4/1994 | Takabayashi et al. | |
| 5,424,507 | A | 6/1995 | Yamaguchi | |
| 5,451,739 | A * | 9/1995 | Nemchinsky et al. | 219/121.51 |
| 5,514,848 | A | 5/1996 | Ross et al. | |
| 5,695,662 | A | 12/1997 | Couch, Jr. et al. | |
| 5,900,168 | A | 5/1999 | Saio et al. | |
| 5,908,567 | A | 6/1999 | Sakuragi et al. | |
| 5,951,888 | A | 9/1999 | Oakley | |
| 5,977,510 | A | 11/1999 | Lindsay | |
| 6,011,238 | A | 1/2000 | Bertez et al. | |
| 6,121,570 | A | 9/2000 | Oakley et al. | |
| 6,207,923 | B1 | 3/2001 | Lindsay | |
| 6,329,627 | B1 | 12/2001 | Walters | |
| 6,362,450 | B1 | 3/2002 | Severance, Jr. | |
| 6,403,915 | B1 | 6/2002 | Cook et al. | |
| 6,420,672 | B1 | 7/2002 | Ulrich et al. | |
| 6,444,944 | B2 | 9/2002 | Schneider et al. | |
| 6,452,130 | B1 | 9/2002 | Qian et al. | |
| 6,622,058 | B1 | 9/2003 | Picard et al. | |
| 6,649,860 | B2 | 11/2003 | Kawachi et al. | |
| 6,657,153 | B2 | 12/2003 | McBennett et al. | |
| 6,689,983 | B2 | 2/2004 | Horner-Richardson et al. | |
| 6,777,638 | B2 | 8/2004 | Nemchinsky et al. | |
| 6,841,754 | B2 | 1/2005 | Cook et al. | |
| 2002/0125224 | A1 | 9/2002 | Cook et al. | |
| 2005/0035093 | A1 | 2/2005 | Yamaguchi et al. | |
| 2005/0045599 | A1 | 3/2005 | Matus | |
| 2005/0077273 | A1 | 4/2005 | Matus et al. | |
| 2005/0082263 | A1 | 4/2005 | Koike et al. | |

FOREIGN PATENT DOCUMENTS

| | | | |
|---|---|---|---|
| WO | 97/33458 | A2 | 9/1997 |
| WO | 03/089179 | | 10/2003 |
| WO | 03/089180 | | 10/2003 |
| WO | 03/089182 | | 10/2003 |

OTHER PUBLICATIONS

Notice of Second Office Action from the State Intellectual Property Office of the People's Republic of China, 7 pages, dated Aug. 16, 2012.

* cited by examiner

PLASMA ARC TORCH HAVING AN ELECTRODE WITH INTERNAL PASSAGES

RELATED APPLICATIONS

This application is a continuation of U.S. Ser. No. 11/223,268 filed Sep. 9, 2005 entitled "Plasma Arc Torch Having an Electrode with Internal Passages" by Twarog which is a continuation-in-part of U.S. application Ser. No. 10/989,729, filed on Nov. 16, 2004, and entitled "Plasma Arc Torch Having an Electrode with Internal Passages" by Twarog et al. This application claims the benefit of and priority to both U.S. Ser. Nos. 11/223,268 and 10/989,729, the contents of each of which are incorporated herein by reference in their entirety.

FIELD OF THE INVENTION

The invention generally relates to the field of plasma arc torch systems and processes. In particular, the invention relates to an improved electrode for use in a plasma arc torch and a method of manufacturing such electrode.

BACKGROUND OF THE INVENTION

Material processing apparatus, such as plasma arc torches and lasers are widely used in the cutting of metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. Gases used in the torch can be non-reactive (e.g., argon or nitrogen), or reactive (e.g., oxygen or air). The torch produces a plasma arc, which is a constricted ionized jet of a plasma gas with high temperature and high momentum.

Plasma arc cutting torches produce a transferred plasma arc with a current density that is typically in the range of 20,000 to 40,000 amperes/in$^2$. High definition torches are characterized by narrower jets with higher current densities, typically about 60,000 amperes/in$^2$. High definition torches produce a narrow cut kerf and a square cut angle. Such torches have a thinner heat affected zone and are more effective in producing a dross free cut and blowing away molten metal.

In the process of plasma arc cutting of a metallic workpiece, a pilot arc is first generated between the electrode (cathode) and the nozzle (anode). The pilot arc ionizes gas passing through the nozzle exit orifice. After the ionized gas reduces the electrical resistance between the electrode and the workpiece, the arc then transfers from the nozzle to the workpiece. The torch is operated in the transferred plasma arc mode, characterized by the conductive flow of ionized gas from the electrode to the workpiece, for the cutting of the workpiece.

In a plasma arc torch using a reactive plasma gas, it is common to use a copper electrode with an insert of high thermionic emissivity material. The insert is press fit into the bottom end of the electrode so that an end face of the insert, which defines an emission surface, is exposed. The exposed surface of the insert is coplanar with the end face of the electrode. The end face of the electrode is typically planar, but in some cases can have, for example, an ellipsoidal, paraboloidal, spherical or frustoconical shape. The insert is typically made of hafnium or zirconium and is cylindrically shaped. The emission surface is typically planar.

In all plasma arc torches, particularly those using a reactive plasma gas, the electrode shows wear over time in the form of a generally concave pit at the exposed emission surface of the insert. The pit is formed due to the ejection of molten emissivity material from the insert. The emission surface liquefies when the arc is first generated, and electrons are emitted from a molten pool of high emissivity material during the steady state of the arc. However, the molten material is ejected from the emission surface during the three stages of torch operation: (1) starting the arc, (2) steady state of the arc, and (3) stopping the arc. A significant amount of the material deposits on the inside surface of the nozzle as well as the nozzle orifice.

Deposition of high emissivity material on the inside surface of the nozzle during the plasma arc start and stop stages is addressed by U.S. Pat. Nos. 5,070,227 and 5,166,494, commonly assigned to Hypertherm, Inc. in Hanover, N.H. It has been found that the heretofore unsolved problem of high emissivity material deposition during the steady state of the arc not only reduces electrode life but also causes nozzle wear.

The nozzle for a plasma arc torch is typically made of copper for good electrical and thermal conductivity. The nozzle is designed to conduct a short duration, low current pilot arc. As such, a common cause of nozzle wear is undesired arc attachment to the nozzle, which melts the copper usually at the nozzle orifice.

Double arcing, i.e., an arc that jumps from the electrode to the nozzle and then from the nozzle to the workpiece, results in undesired arc attachment. Double arcing has many known causes and results in increased nozzle wear and/or nozzle failure. The deposition of high emissivity insert material on the nozzle also causes double arcing and shortens the nozzle life.

SUMMARY OF THE INVENTION

It is therefore a principal object of this invention to reduce the nozzle wear by minimizing the deposition of high emissivity material on the nozzle during the cutting process.

Another principal object of the invention is to reduce the electrode wear by minimizing the ejection of molten emissivity material from the electrode insert.

Another principal object of the invention is to provide an electrode for a plasma arc torch that increases the axial momentum of the plasma arc column, promoting faster and better cutting performance.

Another principal object of the invention is to provide an electrode for a plasma arc torch that results in an improved cut quality.

Yet another principal object of the invention is to maintain the electrode life while reducing nozzle wear.

The present invention features, in one aspect, an improved electrode for a plasma arc cutting torch which minimizes the deposition of high emissivity material on the nozzle. In another aspect, the invention reduces electrode wear by minimizing the ejection of molten emissivity material from the electrode insert. In another aspect, the electrode increases the axial momentum of the plasma arc column, promoting faster and better cutting performance.

The invention, in one embodiment, features an electrode for a plasma arc torch. The electrode includes a body having a first end, a second end in a spaced relationship relative to the first end, and an outer surface extending from the first end to the second end. The body has an end face disposed at the second end of the body. The electrode also includes at least one passage extending from a first opening in the body to a second opening in the end face.

The second opening can be adjacent to the bore in the body of the electrode. The end face of the second end of the body can be transverse to a longitudinal axis of the body. The second end of the body of the electrode can include an ellipsoidal, paraboloidal, spherical or frustoconical shape. The body of the electrode can be an elongated body. The body of the electrode can be a high thermal conductivity material, such as copper.

The at least one passage of the electrode can be located at an angle (e.g., oblique or acute) relative to a longitudinal axis of the body. The at least one passage of the electrode can be parallel to a longitudinal axis of the body of the electrode. The first opening in the body can be in the outer surface of the body or in an end face of the first end of the body. The at least one passage can direct a gas flow from the first opening towards the second opening in the second end. The at least one passage can direct a gas flow from the first opening radially and axially towards the second opening. The at least one passage can direct a gas flow radially from the first opening towards a longitudinal axis of the body and axially towards the second opening. In one embodiment, the at least one passage imparts a tangential velocity component to the gas flow out of the passages. In another embodiment, the at least one passage directs a gas flow from the first opening radially, axially, and/or tangentially towards the second opening. The gas flow exiting the second opening can be a swirling flow.

The electrode can include an insert formed of high thermionic emissivity material (e.g., hafnium) located within a bore disposed in the second end of the body, wherein an end face of the insert is located adjacent the second opening. The second end of the body can include an outer edge and a recessed region located between the outer edge and the end face of the insert. The second opening can be located in the recessed region.

The electrode can include a cap that is located at the second end of the body, wherein the at least one passage is defined by the cap and the body. The body of the electrode can include a flange that is located at the second end of the body. The first and second openings can be in the flange. The body of the electrode can include at least two components that form the at least one passage when the at least two components are assembled. The at least two components can be assembled by an assembly method, such as by brazing, soldering, welding or bonding. The at least two components can include mating threads.

The electrode can include a plurality of passages. The plurality of passages can each extend from a respective first opening in the body of the electrode to a respective second opening in the second end of the body of the electrode. The plurality of passages can be mutually equally angularly spaced around a diameter of the body of the electrode. The end face of the second end of the body can include a recess. The second opening can be located in the recess.

In another embodiment of the invention, an electrode features a body having a first end and a second end in a spaced relationship relative to the first end. The body has an end face disposed at the second end of the body. The electrode also includes at least one passage extending through the body. The at least one passage is dimensioned and configured to direct a gas flow that enters a first opening adjacent the second end of the body and exits a second opening in the end face of the second end of the body.

In another embodiment of the invention, an electrode includes a body defining a longitudinal axis extending from a first end of the body to a second end of the body, the body having an end face disposed at the second end. The electrode also includes at least one passage formed in the body extending from a first opening in the body to a second opening in the body. The second opening imparts at least an axial velocity component to a gas flow out of the at least one passage. The electrode also can include an insert formed of high thermionic emissivity material located within a bore disposed in the second end of the body. An end face of the insert can be located adjacent to the second opening.

In another embodiment of the invention, an electrode includes a body having a first end, a second end in a spaced relationship relative to the first end, and an outer surface extending from the first end to the second end. The body has an end face disposed at the second end. The electrode also includes at least one axially and radially directed passage formed in the body that extends from a first opening in the outer surface of the body to a second opening in the end face of the second end of the body. The second opening can be adjacent to a bore in the second end of the body of the electrode.

In another embodiment of the invention, an electrode includes a body having a first end, a second end in a spaced relationship relative to the first end, and an outer surface extending from the first end to the second end. The body defines a bore disposed in the second end of the body. The electrode also includes at least one passage that extends from a first opening in the body to a second opening adjacent the bore in the second end of the body.

In general, in another embodiment the invention relates to a method for fabricating an electrode for a plasma arc torch according to one aspect of the invention. The method involves forming a body that has a first end, a second end in a spaced relationship relative to the first end, and an outer surface extending from the first end to the second end. The body has an end face disposed at the second end. The method also involves forming at least one passage that extends from a first opening in the body to a second opening in the end face. The second opening can be adjacent to a bore in the second end of the body of the electrode.

The second end of the electrode can be located in an end face of the second end of the body. The body of the electrode can be a high thermal conductivity material, such as copper. The at least one passage can be located at an angle (e.g., oblique or acute) relative to a longitudinal axis of the body. The first opening can be located in the outer surface of the body. The at least one passage can be formed by brazing, soldering, welding or bonding at least two components. The at least one passage can be formed by joining at least two components, where the two components have mating threads. The at least one passage can be formed by assembling a cap and the body of the electrode.

The method for fabricating an electrode can include forming an insert of high thermionic emissivity material (e.g., hafnium) and inserting the insert into a bore disposed in the second end of the body.

In another embodiment of the invention, an electrode includes a body having a first end, a second end in a spaced relationship relative to the first end, and an outer surface extending from the first end to the second end. The body has an end face disposed at the second end. The electrode also includes a means for directing a gas flow from an opening in the end face at the second end of the body.

In another aspect, the present invention features a plasma arc torch for marking or cutting a workpiece. The torch includes a torch body that has a plasma flow path for directing a plasma gas to a plasma chamber in which a plasma arc is formed. The torch also includes an electrode mounted in the torch body. The electrode includes an electrode body that has a first end, a second end in a spaced relationship relative to the first end, and an outer surface extending from the first end to the second end. The electrode body of the electrode has an end face disposed at the second end of the electrode body. The electrode also includes at least one passage that extends from a first opening in the electrode body to a second opening in the end face at the second end of the electrode body. The second opening can be adjacent to a bore in the body of the electrode.

The torch can include a nozzle mounted relative to the electrode in the torch body to define the plasma chamber. The at least one passage can be located at an angle (e.g., oblique or acute) relative to a longitudinal axis of the body of the electrode. The at least one passage can direct a gas flow from the first opening towards the second opening. The torch can include an insert formed of high thermionic emissivity material (e.g., hafnium) located within a bore disposed in the second end of the electrode body, wherein an end face of the insert can be located adjacent the second opening.

The torch can include a cap located at the second end of the electrode body of the electrode, wherein the at least one passage is defined by the cap and the electrode body. The body of the electrode can include at least two components that form the at least one passage when the at least two components are assembled.

The electrode of the torch can include a plurality of passages. The plurality of passages can be mutually equally angularly spaced around a diameter of the body of the electrode. The plurality of passages can each extend from a respective first opening in the body of the electrode to a respective second opening in the second end of the body of the electrode. The torch can include a gas source for supplying a flow of gas (e.g., at least one of oxygen, air, hydrogen, argon, methane, carbon dioxide or nitrogen) to the plurality of passages.

In another aspect, the present invention features a plasma arc torch for marking or cutting a workpiece. The torch includes a torch body that has a plasma flow path for directing a plasma gas to a plasma chamber in which a plasma arc is formed. The torch also includes an electrode mounted in the torch body. The electrode includes an electrode body that has a first end, a second end in a spaced relationship relative to the first end, and an outer surface extending from the first end to the second end. The electrode body has an end face disposed at the second end of the electrode body. The torch also includes a component mounted in the torch body defining at least one passage. The passage has a first opening and second opening. The second opening imparts an axial velocity component to a gas flow out of the second opening of the at least one passage. The electrode can include an insert formed of high thermionic emissivity material located within a bore disposed in the second end of the electrode body. An end face of the insert can be located adjacent to the second opening of the at least one passage.

In another aspect, the present invention features a plasma arc torch for marking or cutting a workpiece. The torch includes a torch body that has a plasma flow path for directing a plasma gas to a plasma chamber in which a plasma arc is formed. The torch also includes an electrode mounted in the torch body. The electrode includes an electrode body that has a first end, a second end in a spaced relationship relative to the first end, and an outer surface extending from the first end to the second end. The electrode body has an end face disposed at the second end of the electrode body. The torch also includes a component mounted in the torch body defining at least one passage. The passage has a first opening and second opening. The passage directs a flow of gas that exits the second opening adjacent the second end of the electrode body.

In another aspect, the present invention features an assembly for use in a plasma arc torch for marking or cutting a workpiece. The assembly includes a nozzle mounted relative to an electrode in a torch body. The assembly also includes a component mounted relative to the nozzle, the component defining at least one passage, the at least one passage having a first and second opening, and the at least one passage directing a flow of gas exiting the second opening adjacent an insert in the electrode. The at least one passage can be a tapered orifice.

In another aspect, the present invention features a torch tip for a plasma arc torch. The plasma arc torch has a hollow torch body that includes a plasma chamber in which a plasma arc is formed. The torch tip includes an electrode having an electrode body having a first end, a second end in a spaced relationship relative to the first end, and an outer surface extending from the first end to the second end. The electrode body has an end faced disposed at the second end of the electrode body. The electrode also includes at least one passage that extends from a first opening in the electrode body to a second opening in the end face at the second end of the electrode body. The second opening can be adjacent to the bore in the body of the electrode. The torch tip also includes a nozzle mounted relative to the electrode in the torch body to define the plasma chamber. The torch tip can include a shield.

In another aspect, the invention features a plasma arc torch system including a torch body connected to a power supply and an electrode with an electrode body having at least one passage. The second end of at least one of the passages is disposed at a second end of the electrode body. The electrode and a nozzle are mounted in a mutually spaced relationship to form a plasma chamber at a first end of the torch body. A plasma gas flows through the plasma chamber. A controller controls an electrode gas flowing through at least one of the passages as a function of a plasma arc torch parameter.

The invention also features a plasma arc torch including a torch body connected to a power supply. The torch body includes a plasma flow path for directing a plasma gas to a plasma chamber where a plasma arc is formed. An electrode with an electrode body having at least one passage is mounted in the torch body. A controller is disposed within the torch body. The controller is for controlling the electrode gas flow through at least one of the passages as a function of a plasma arc torch parameter. Alternatively, a connector for connecting a controller is disposed within the torch body. The controller can be connected to the plasma arc torch such that it is separate from or, alternatively, disposed on or on the plasma arc torch.

In one embodiment, the controller controls an electrode gas valve system to enable the electrode gas to flow through at least one of the passages. Alternatively or in addition, the controller controls a plasma gas valve system to enable plasma gas to flow through the plasma chamber. The electrode gas can be a non-oxidizing gas such as, for example, nitrogen, argon, hydrogen, helium, hydrocarbon fuels, or any mixture thereof. In one embodiment, the plasma gas includes oxygen and the electrode gas includes nitrogen. In one embodiment, the plasma gas and the electrode gas contact one another in the plasma chamber. The plasma gas and the electrode gas can be separate streams prior to when they contact one another in the plasma chamber. In one embodiment, the plasma gas and the electrode gas are mixed upstream of the plasma chamber.

The plasma arc torch parameter includes, for example, plasma arc current, voltage, pressure, flow, timed sequence, or any combination of these. In one embodiment, the plasma arc torch parameter is a predetermined current, predetermined voltage, predetermined pressure, predetermined flow rate, or any combination of these.

The controller can provide the electrode gas flow during any point in the plasma arc cycle. For example, the controller provides the electrode gas flow before initiating the plasma arc, upon initiating the plasma arc, during plasma arc delivery, before extinguishing the plasma arc, or upon extinguishing the plasma arc. The controller can be located exterior to or within, for example, the power supply.

In one embodiment, the plasma arc torch system includes a retaining cap mounted on the torch body and substantially enclosing an outer surface of the nozzle. In another embodiment, a shield having a central circular opening is aligned with the nozzle. In another embodiment, a bore is disposed in the second end of the electrode body and an insert is located within the bore. An end face of the insert can be located adjacent the second opening of at least one passage. The controller can provide the electrode gas about the insert. Optionally, the electrode gas surrounds at least a portion of the insert. The insert can be formed of a high thermionic emissivity material such as, for example, tungsten or hafnium.

In another aspect, the invention features a method for operating a plasma arc torch system. The method includes providing a plasma chamber defined by an electrode and a nozzle. The electrode is mounted in a mutually spaced relationship with the nozzle. The electrode body has at least one passage. The method includes directing a plasma gas through the plasma chamber in which a plasma arc is formed. The method also includes directing an electrode gas through at least one of the passages and controlling the electrode gas flow through at least one of the passages as a function of a plasma arc torch parameter. In one embodiment, the controlled electrode gas flows about an insert located within a bore disposed in the second end of the electrode. The electrode gas flow surrounds, for example, at least a portion of an insert.

In another embodiment, the method includes controlling an electrode gas valve system to enable the electrode gas to flow through at least one of the passages. Alternatively or in addition, the method includes controlling a plasma gas valve system to enable the plasma gas to flow through the plasma chamber.

The foregoing and other objects, aspects, features, and advantages of the invention will become more apparent from the following description and from the claims.

BRIEF DESCRIPTION OF THE DRAWINGS

The foregoing and other objects, feature and advantages of the invention, as well as the invention itself, will be more fully understood from the following illustrative description, when read together with the accompanying drawings which are not necessarily to scale.

DETAILED DESCRIPTION OF ILLUSTRATIVE EMBODIMENTS

Figure 1:
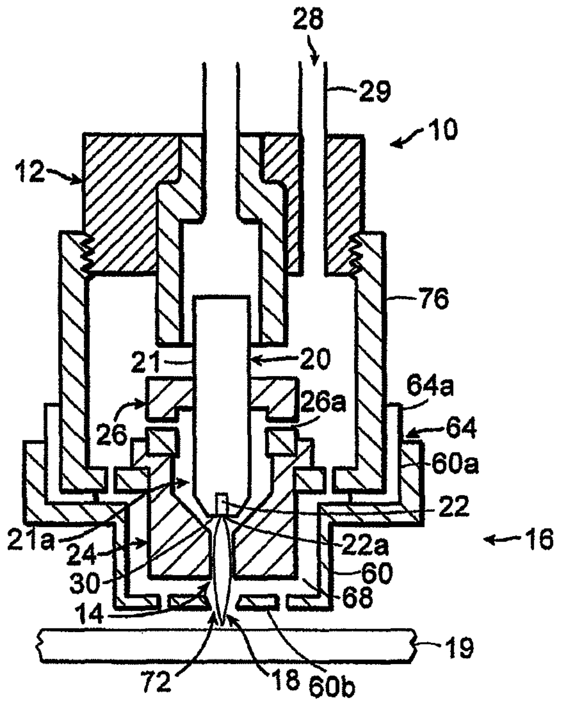
FIG. 1 PRIOR ART
FIG. 1 is a cross-sectional view of an illustration of a conventional plasma arc cutting torch.

FIG. 1 illustrates in simplified schematic form of a typical plasma arc cutting torch 10 representative of any of a variety of models of torches sold by Hypertherm, Inc., with offices in Hanover, N.H. The torch 10 has a body 12 that is typically cylindrical with an exit orifice 14 at a lower end 16. A plasma arc 18, i.e., an ionized gas jet, passes through the exit orifice 14 and attaches to a workpiece 19 being cut. The torch 10 is designed to pierce and cut metal, particularly mild steel, or other materials in a transferred arc mode. In cutting mild steel, the torch 10 operates with a reactive gas, such as oxygen or air, as the plasma gas 28 to form the transferred plasma arc 18.

The torch body 12 supports a copper electrode 20 having a generally cylindrical body 21. A hafnium insert 22 is press fit into the lower end 21*a* of the electrode 20 so that a planar emission surface 22*a* is exposed. The torch body 12 also supports a nozzle 24 which is spaced from the electrode 20. The nozzle 24 has a central orifice that defines the exit orifice 14. A swirl ring 26 mounted to the torch body 12 has a set of radially offset (or canted) gas distribution holes 26*a* that impart a tangential velocity component to the plasma gas flow causing it to swirl. This swirl creates a vortex that constricts the arc 18 and stabilizes the position of the arc 18 on the insert 22. The torch also has a shield 60. The shield 60 is coupled (e.g., threaded at its upper side wall 60*a* to an insulating ring 64. The insulating ring 64 is coupled (e.g., threaded) at its upper side wall 64*a* to a cap 76 that is threaded on to the torch body 12. The shield 60 is configured so that it is spaced from the nozzle 24 to define a gas flow passage 68. A front face 60*b* of the shield 60 has an exit orifice 72 aligned with the nozzle exit orifice 14.

In operation, the plasma gas 28 flows through a gas inlet tube 29 and the gas distribution holes 26*a* in the swirl ring 26. From there, the plasma gas 28 flows into the plasma chamber 30 and out of the torch 10 through the exit orifice 14 and exit orifice 72. A pilot arc is first generated between the electrode 20 and the nozzle 24. The pilot arc ionizes the gas passing through the nozzle exit orifice 14 and the shield exist orifice 72. The arc then transfers from the nozzle 24 to the workpiece 19 for cutting the workpiece 19. It is noted that the particular construction details of the torch 10, including the arrangement of components, directing of gas and cooling fluid flows, and providing electrical connections can take a wide variety of forms.

Figure 2A:
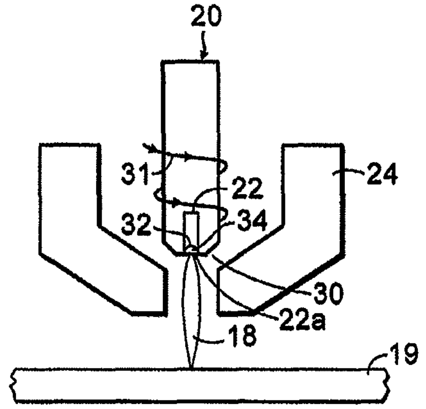
FIG. 2A PRIOR ART
FIG. 2A is a partial cross-sectional view of the torch of FIG. 1 illustrating the concave shape of the emissive surface of the electrode insert created during operation of the torch.

Referring to FIG. 2A, it has been discovered that during operation of a conventional plasma arc torch, for example, the torch 10 of FIG. 1, the plasma arc 18 and a swirling gas flow 31 in the plasma chamber 30 actually force the shape of the emissive surface 22*a* of the hafnium insert 22 to be generally concave at steady state. Because the emissive surface 22*a* has a generally planar initial shape in a conventional torch, molten hafnium is ejected from the insert 22 during operation of the torch until the emission surface 22*a* has the generally concave shape. Thus, the shape of the emission surface 22*a* of the insert 22 changes rapidly until reaching the forced concave shape at steady state. The result is a pit 34 being formed in the insert 22.

It has been determined that the curvature of the concave shaped surface 32 is a function of the current level of the torch, the diameter (A) of the insert 22 and the pattern of the swirling gas flow 31 in the plasma chamber 30 of the torch 10. Thus, increasing the current level for a constant insert diameter results in the emission surface 22*a* having a deeper concave shaped pit. Similarly, increasing the diameter of the hafnium insert 22 or the swirl strength of the gas flow 31 while maintaining a constant current level results in a deeper concave shape.

The swirling gas flow 31 over the emission surface 22*a* of the hafnium insert 22 results, generally, in molten hafnium being ejected from the insert 22. The corresponding pit created in the insert 22 can result in deterioration in cut quality and ultimately the end of the consumable's service life. It is generally desirable to reduce the consumption of the hafnium insert (i.e., ejection of molten hafnium) to prolong the consumable life.

Figure 2B:
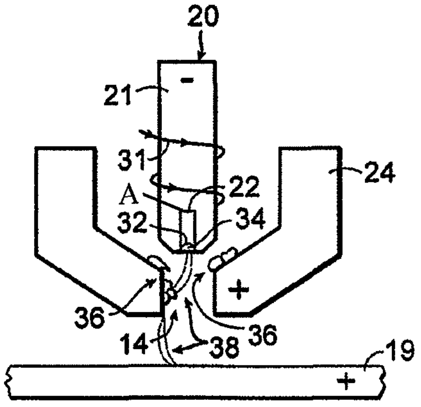
FIG. 2B PRIOR ART
FIG. 2B is a partial cross-sectional view of the torch of FIG. 1 illustrating double arcing and nozzle wear caused by deposition of the electrode insert material on the nozzle during operation of the torch.

Referring to FIG. 2B, it has also been discovered that molten hafnium 36 ejected from the insert 22 during operation of the torch 10 is deposited onto the nozzle 24 causing a double arc 38 which damages the edge of the nozzle orifice 14 and increases nozzle wear and pitting of the emission surface of the hafnium insert 22. After pilot arc transfer, the nozzle 24 is normally insulated from the plasma arc by a layer of cold gas. However, this insulation is broken by molten hafnium being ejected into the gas layer, causing the nozzle 24 to become an easier path for the transferred plasma arc. The result is double arcing 38 as shown.

Figure 3B:
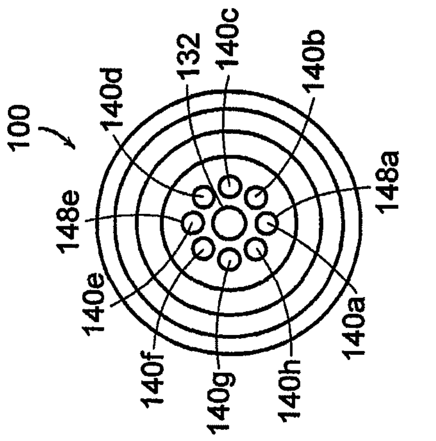
FIG. 3B is an end-view of the electrode of FIG. 3A.
Figure 3A:
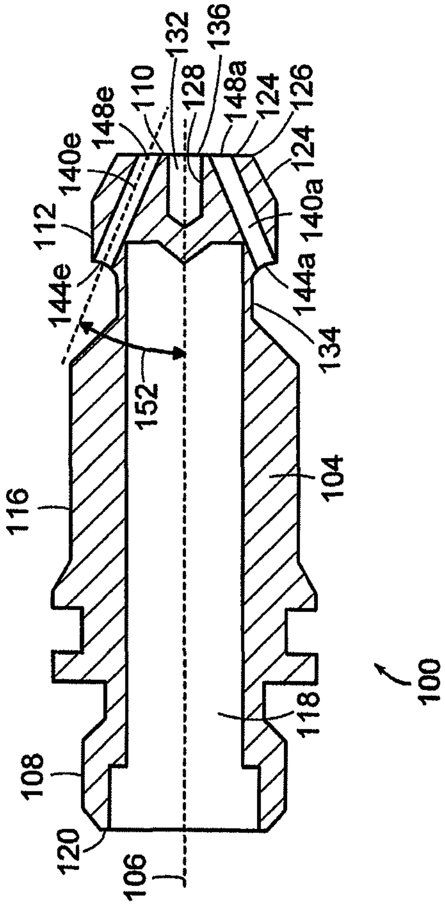
FIG. 3A is a cross-sectional view of an electrode, according to an illustrative embodiment of the invention.

In accordance with the present invention, an improved electrode 100 for a plasma arc cutting torch reduces electrode wear and minimizes the deposition of electrode insert material (e.g., hafnium) onto a nozzle. FIGS. 3A and 3B illustrate one embodiment of an electrode 100 incorporating the principles of the invention. The electrode 100 has a generally cylindrical elongated body 104 formed of a high thermal conductively material such as copper. The electrode body 104 extends along a longitudinal axis 106 of the electrode 100, which is common to the torch (not shown) when the electrode 100 is installed therein. The electrode 100 has a hollow interior 118 that extends along the longitudinal axis 106 of the electrode 100. The electrode body 104 has a first end 108 and a second end 112 and an outer surface 116 that lies between the first end 108 and the second end 112. The first end 108 has an end face 120 that defines a planar surface that is transverse to the longitudinal axis 106 of the electrode 100. The second end 112 has an end face 124 that defines a planar surface 110 that is transverse to the longitudinal axis 106 of the electrode 100. In this embodiment, the end face 124 has a generally frustoconical shape. Alternatively, the second end 112 and/or end face 124 may have a different shape, for example, an ellipsoidal, parabaloidal or spherical shape.

A bore 128 is formed in the second end 112 of the electrode body 104 along the longitudinal axis 106 of the electrode 100. A generally cylindrical insert 132 formed of a high thermionic emissivity material (e.g., hafnium) is press fit into the bore 128. An emission surface 136 of the insert 132 is located within the bore 128 such that an end face defined by the emission surface 136 is generally coplanar with the planar surface 110 of the end face 124 of the second end 112 of the electrode body 104. The end face 124 has an edge 126. The edge 126 may, for example, have a radius or a sharp edge. In this embodiment, the electrode body 104 also has a groove 134 (e.g., an annular recess) that extends around an outer diameter of the second end 112 of the body 104 of the electrode 100.

As shown, the electrode 100 has multiple (e.g., eight) passages 140*a*, 140*b*, 140*c*, 140*d*, 140*e*, 140*f*, 140*g*, 140*h* (generally 140) that extend through the body 104 of the electrode 100. Each passage 140 has a respective first opening (generally 144) located in the groove 134. Each passage 140 also has a respective second opening (generally 148). For example, the passage 140*a* has a first opening 144*a* located in the groove 134 of the second end 112 of the body 104 and a second opening 148*a* located in the end face 124 of the second end 112 of the body 112. The second opening 148*a* is located adjacent the emission surface 136 of the insert 132. The passages 140 are capable of directing an electrode gas flow from respective first openings 144 towards the second openings 148. The gas flowing through each passage 140 is referred to as electrode gas. The second openings 148 impart at least an axial velocity component to the electrode gas flow exiting the passages 140. In some embodiments, the first opening 144 of the passages 140 is located partially within the groove 134. In some embodiments, the first opening 144 is not located within the groove 134. In some embodiments, the electrode 100 lacks a groove 134.

Generally, gas flowing through the passages 140 is referred to as electrode gas and gas that forms the plasma arc is referred to as plasma gas. The electrode gas flow directed through the passages 140 may be, for example, a gas for creating a plasma arc such as oxygen or air. Alternatively, the electrode gas flow can be a flow of one or more gases (e.g., oxygen, air, hydrogen and nitrogen, argon, methane and carbon dioxide). The electrode gas can be supplied by the same source of gas used to provide the plasma gas for creating the transferred plasma arc in operation. In some embodiments, an alternative source of gas provides the electrode gas flow to the passages 140 via, for example, one or more hoses or conduits, or passages in the torch to the first openings 144.

It has been determined that oxidizing gases (e.g., air or oxygen) in the vicinity of the electrode (e.g., emission surface 136 of the insert 132) contribute to poor electrode 100 life, particularly during starting of the torch. Accordingly, in some embodiments, alternative non-reactive gases (e.g., nitrogen) or gases containing a combination of oxidizing and non-oxidizing gases are instead directed as electrode gas through the passages 140 to improve electrode 100 life by, for example, reducing the percent of oxidizing gas (e.g., plasma gas) in the region of the insert 132. In one embodiment, a valve (not shown) controls the flow of a non-oxidizing electrode gas (e.g., nitrogen) through the passages 140. In one embodiment, the electrode gas is directed through the passages to coincide with initiating and/or extinguishing the plasma arc. The second openings 148 of the passages 140 impart a substantially axial (i.e., along the longitudinal axis 106) velocity component to the electrode gas exiting the second openings 148. In some embodiments, the control of the flow of electrode gas is timed to coincide with, for example, one or more of the current delivered to the torch, an increase or decrease in plasma gas pressure, initiating the plasma arc, and extinguishing the plasma arc. A controller (not shown) can be employed to control the electrode gas flow through one or more passages 140 in an electrode 100. For example, a plasma arc torch or a plasma arc torch system that employs an electrode 100 having one or more passages 140 can include a controller to control electrode gas flow. In one embodiment, the controller is for controlling the electrode gas flow through at least one passage 140 as a function of a plasma torch parameter. Plasma arc torch parameters include, for example, current, voltage, flow, a pre-determined timed sequence, or any combination of these parameters.

The passages 140 are located at an angle 152 (e.g., an acute or oblique angle) relative to the longitudinal axis 106 of the electrode 100. The angle 152, the number of passages 140 and the diameter of the passages 140 may be selected to, for example, reduce the swirl strength of the plasma gas in the region of the arc emitted from the emission surface 136 of the insert 132. Reducing the swirl strength, for example, decreases the ejection of molten emissivity material from the insert 132 because the axial velocity component of the gas flow out of the passages 140 reduces the aerodynamic forces acting on the insert 132. By way of example, the angle 152, the number of passages 140, and the diameter of the passages 140 may be selected as a function of the operating current level of the torch, diameter of the insert 132 and the plasma gas flow pattern and/or strength in the torch. In some embodiments, the passages 140 are located parallel to the longitudinal axis 106 of the electrode 100.

By way of illustration, an experiment was conducted to demonstrate the reduction of wear in the emission surface of the insert of an electrode. Eight passages 140 were formed in the body of the electrode, for example, the electrode 100 of FIGS. 3A and 3B. The passages each had a diameter of about 1.04 mm located at an angle 152 of about 22° relative to the longitudinal axis 106 of the electrode 100. In operation in a torch, for equivalent operating conditions, an electrode employing the passages exhibited less wear in the emissive surface than the electrode without passages.

Alternative numbers and geometries of passages 140 are within the scope of the invention. By way of example, the passages 140*a* may have a circular, ellipsoidal, otherwise curved, or rectilinear cross-sectional shape, for example, when viewed from the end-view orientation of FIG. 3B. In some embodiments, however, the passages 140 are oriented to also impart a tangential velocity component to the gas flow out of the passages 140 causing a swirling flow. In this manner, the passages 140 are capable of directing a flow of electrode gas from the second openings 148 that has axial, radial, and tangential velocity components. The passages 140 may be oriented, for example, similarly to the passages in a swirl ring (e.g., radially offset or canted) to impart a tangential velocity component to the electrode gas flow.

Figure 4:
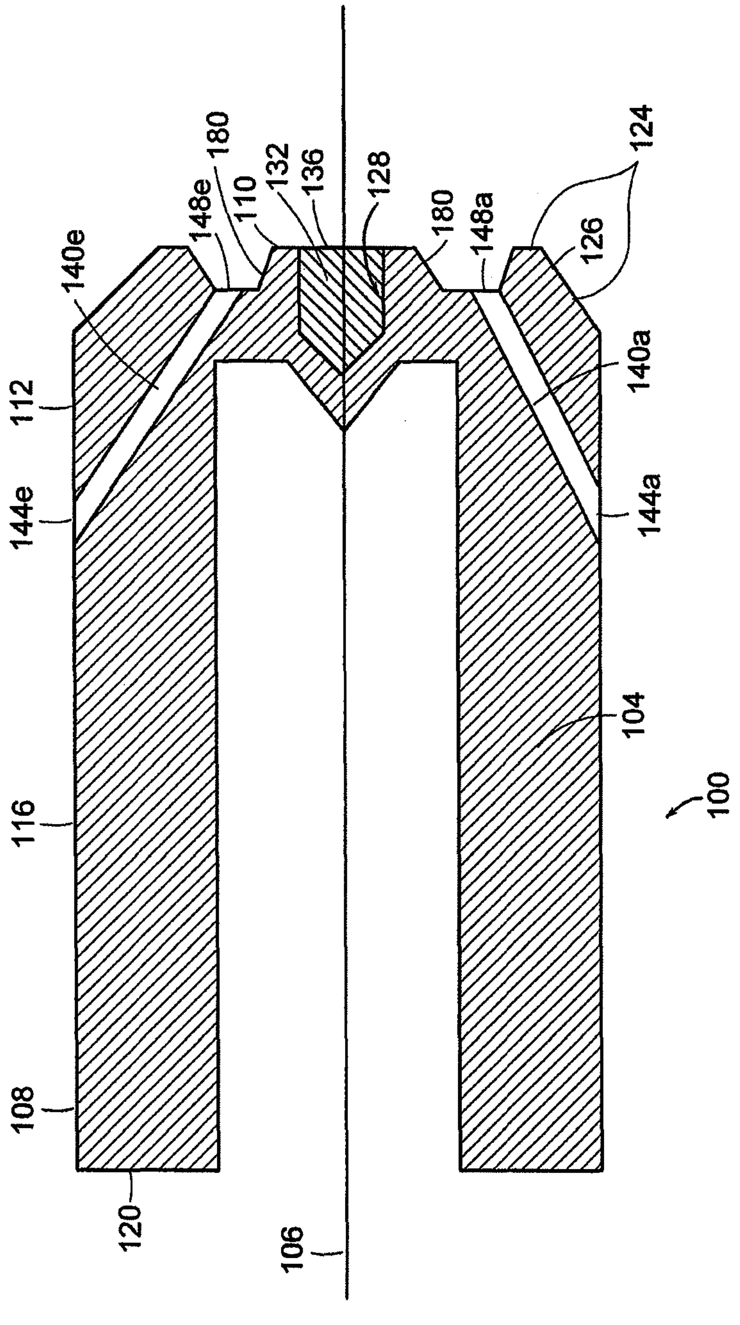
FIG. 4 is a cross-sectional view of an electrode, according to an illustrative embodiment of the invention.

In another embodiment of the invention, illustrated in FIG. 4, the electrode 100 has a plurality of passages 140 (140*a* and 140*e* shown; 140*b*, 140*c*, 140*d*, 140*f*, 140*g*, and 140*h* not shown). The body 104 of the electrode 100 has an annular recessed region 180 in the end face 124 of the second end 112 of the body 104. The passages 140 each extend from respective first openings 144 in the outer surface 116 of the body 104 to respective second openings 148 in the recess 180 of the end face 124 of the second end 112 of the body 104.

Figure 5:
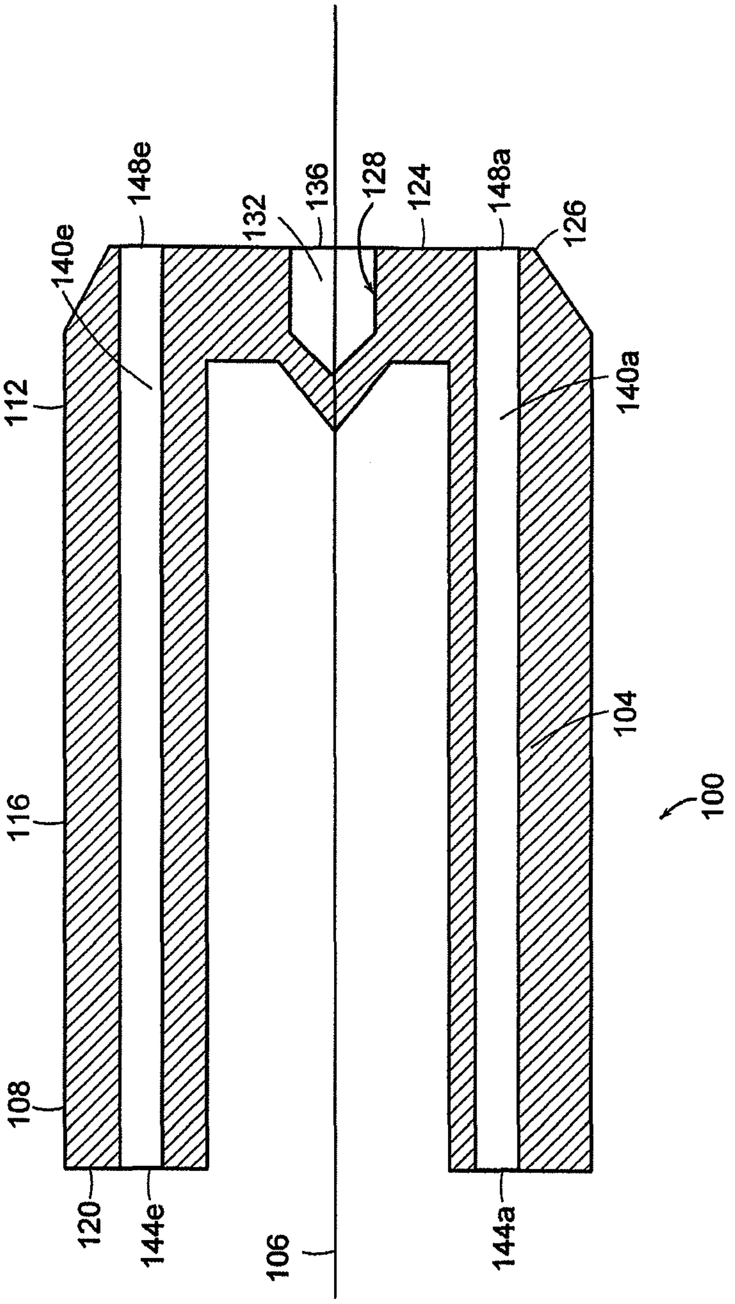
FIG. 5 is a cross-sectional view of an electrode, according to an illustrative embodiment of the invention.

In another embodiment of the invention, illustrated in FIG. 5, the electrode 100 has a plurality of passages 140 (140*a* and 140*e* shown; 140*b*, 140*c*, 140*d*, 140*f*, 140*g*, and 140*h* not shown). The passages 140 each extend from respective first openings 144 in an end face 120 of the first end 108 of the body 104 of the electrode 100 to respective second openings 148 in the end face 124 of the second end 112 of the body 104. The second openings 148 are located adjacent the emission surface 136 of the insert 132. In this embodiment the passages 140 are generally parallel to the longitudinal axis 106 of the electrode 100. Alternatively, the passages 140 could be oriented at an angle relative to the longitudinal axis 106 of the electrode 100.

Figure 6:
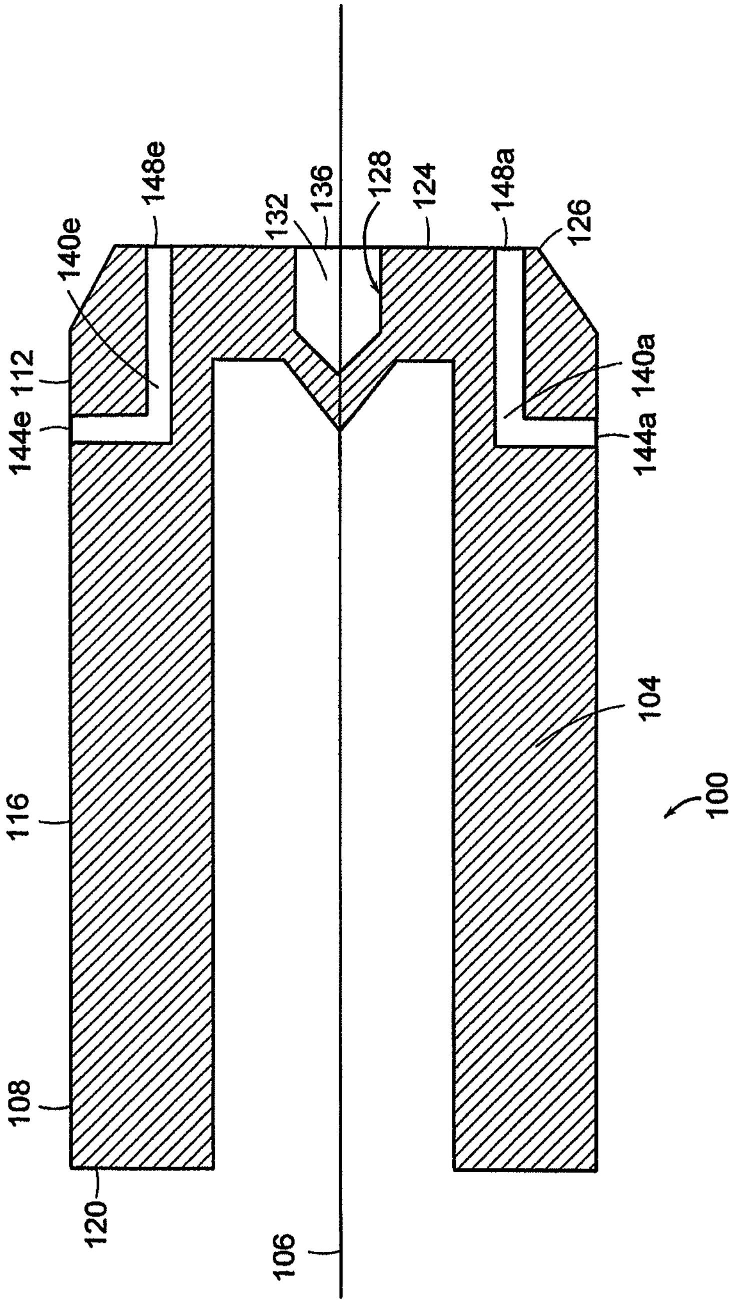
FIG. 6 is a cross-sectional view of an electrode, according to an illustrative embodiment of the invention.

In another embodiment of the invention, illustrated in FIG. 6, the electrode 100 has a plurality of passages 140 (140*a* and 140*e* shown; 140*b*, 140*c*, 140*d*, 140*f*, 140*g*, and 140*h* not shown). In this embodiment the passages 140 each have respective first openings 144 in the second end 112 of the body 104 of the electrode 100 and respective second openings 148 in the second end 112 of the body 104. The passages 140 direct an electrode gas flow entering the first openings 144 radially towards the longitudinal axis 106 of the electrode 100 and then axially towards the second openings 148.

Figure 7:
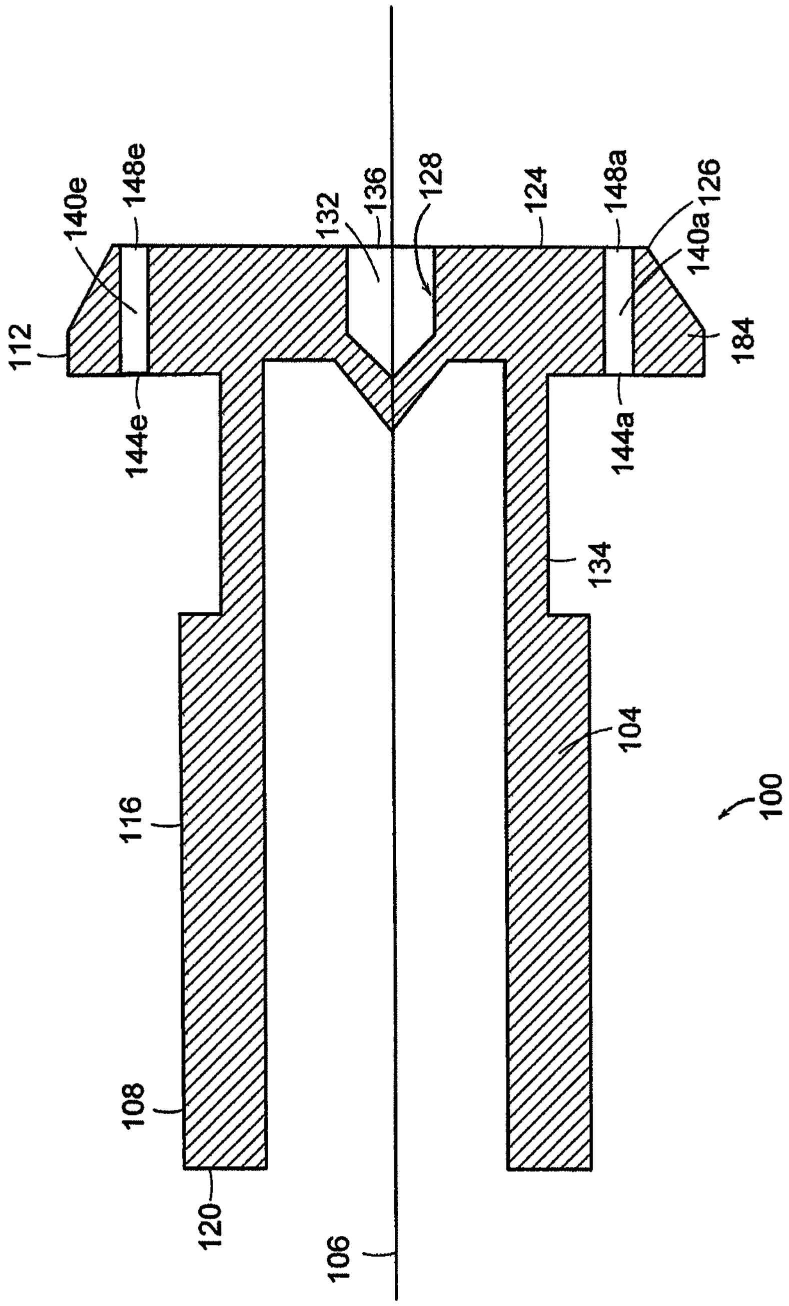
FIG. 7 is a cross-sectional view of an electrode, according to an illustrative embodiment of the invention.

In another embodiment of the invention, illustrated in FIG. 7, the electrode 100 has a flange 184 located at the second end 112 of the body 104 of the electrode 100. The body has a plurality of passages 140 (140*a* and 140*e* shown; 140*b*, 140*c*, 140*d*, 140*f*, 140*g*, and 140*h* not shown) located in the flange 184. Each of the passages 140 has respective first openings 144 and respective second openings 148 also located in the flange 184.

Figure 8:
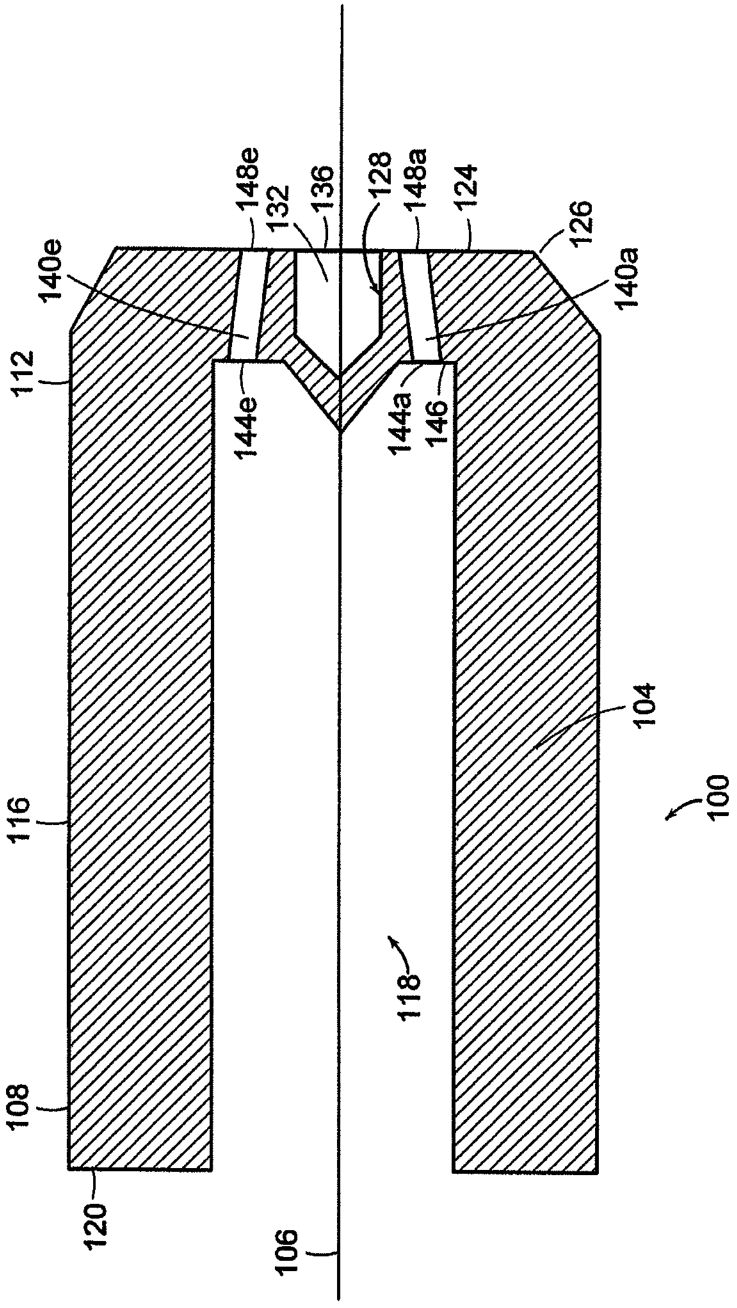
FIG. 8 is a cross-sectional view of an electrode, according to an illustrative embodiment of the invention.

In another embodiment of the invention, illustrated in FIG. 8, the electrode 100 has a plurality of passages 140 (140*a* and 140*e* shown; 140*b*, 140*c*, 140*d*, 140*f*, 140*g*, and 140*h* not shown). The electrode 100 has a hollow interior 118 adjacent an inner surface 146 of the second end 112 of the body 104 of the electrode 100. The passages 140 each extend from respective first openings 144 in the inner surface 146 of the second end 112 of the body 104 to respective second openings 148 in the end face 124 of the second end 112 of the body 104.

Figure 9:
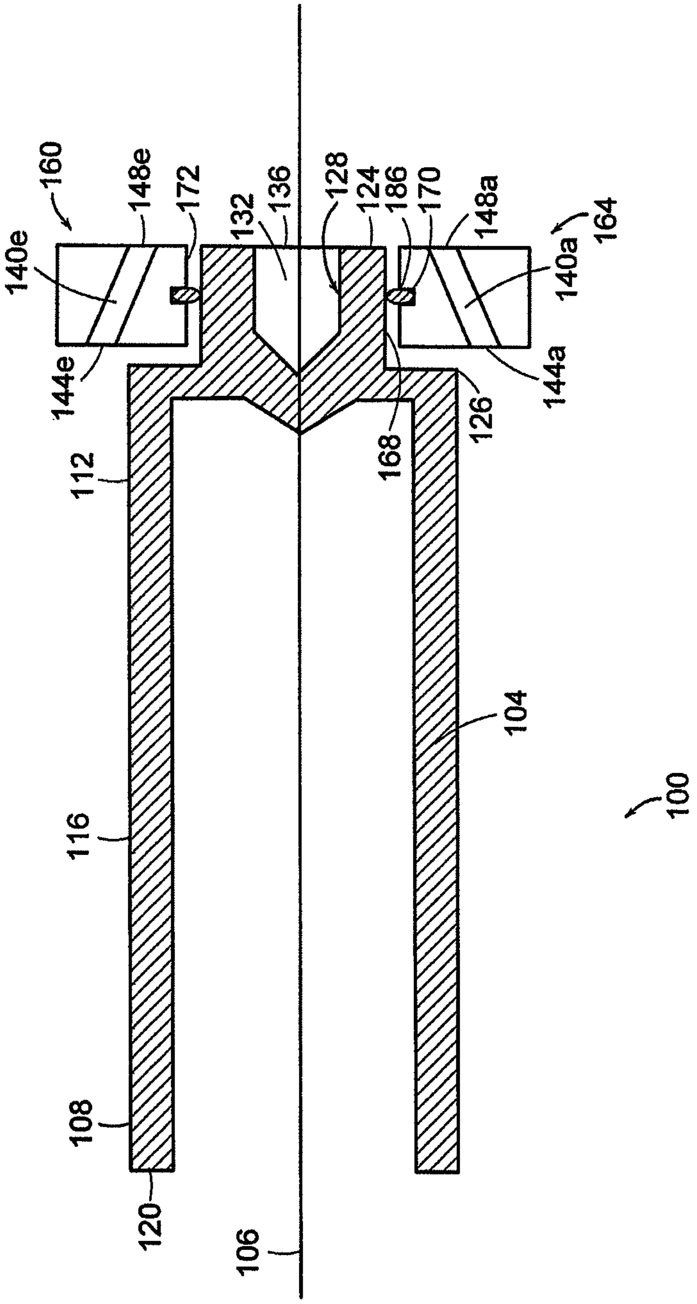
FIG. 9 is a cross-sectional view of an electrode, according to an illustrative embodiment of the invention.

In another embodiment, illustrated in FIG. 9, the electrode 100 has a generally cylindrical elongated body 104 formed of a high thermal conductivity material. The electrode body 104 extends along a longitudinal axis 106 of the electrode 100. The second end 112 of the body 104 of the electrode 100 has a location 168 (e.g., a shoulder) of reduced diameter relative to the outer surface 116 at the first end 108 of the body 104. The electrode 100 also has a component 160 that has two passages 140 (140*a* and 140*e*). Alternative numbers and geometries of passages 140 are within the scope of the invention. The component 160 has a generally cylindrical body 164 that extends along the longitudinal axis 106 of the electrode 100. The component 160 has a central hole 172 that also extends along the common longitudinal axis 106. The passages 140*a* and 140*e* each extend through the body 164 of the component 160 from first openings 144 (144*a* and 144*e*, respectively) to second openings 148 (148*a* and 148*e*, respectively). In a similar manner as described previously herein, an electrode gas flow is directed through the passages 140 to a location adjacent the insert 132 which is located in the bore 128 of the electrode 100.

In this embodiment, the component 160 has an annular groove 170 located on an inner surface 176 within the hole 172 of the component 160. An o-ring 186 is located partially within the groove 172. When assembled, the o-ring 186 is partially in contact with the location 168 of the body 104 of the electrode 100. In this manner, the component 160 is coupled via the o-ring 186 to the location 168 of the body 104 of the electrode 100.

By way of example, the component 160 can be formed of a high thermal conductivity material (e.g., copper). In some embodiments, the component 160 may be formed from a ceramic, composite, plastic or metal material. In some embodiments, the component 160 can be formed from one or more pieces. In some embodiments, the component 160 can be press fit or bonded to the body 104 of the electrode 100. In some embodiments, the component 160 is not in contact with the electrode 100 and is instead, for example, coupled to a nozzle (not shown) of the torch in a position adjacent to the second end 112 of the electrode 100. In this manner, the component 160 is still able to direct a flow of electrode gas to a location adjacent to the insert 132 of the electrode 100. In some embodiments, the component 160 is coupled to a torch body (not shown) of the torch. The passages 140 that are formed in the component 160 direct a flow of electrode gas to a location adjacent to the insert 132 of the electrode 100. The second openings 148 impart at least an axial velocity component to an electrode gas flow out of the passages 140.

In some embodiments, the passages 140 are formed in a nozzle (not shown) of the torch and the second openings 148 are located adjacent to the second end 112 of the electrode. In this manner, the passages 140 direct a flow of an electrode gas to a location adjacent to the insert 132 of the electrode 100. In other embodiments, the passages 140 are formed in a torch body and direct a flow of an electrode gas to a location adjacent to the insert 132 of the electrode 100.

Figure 10:
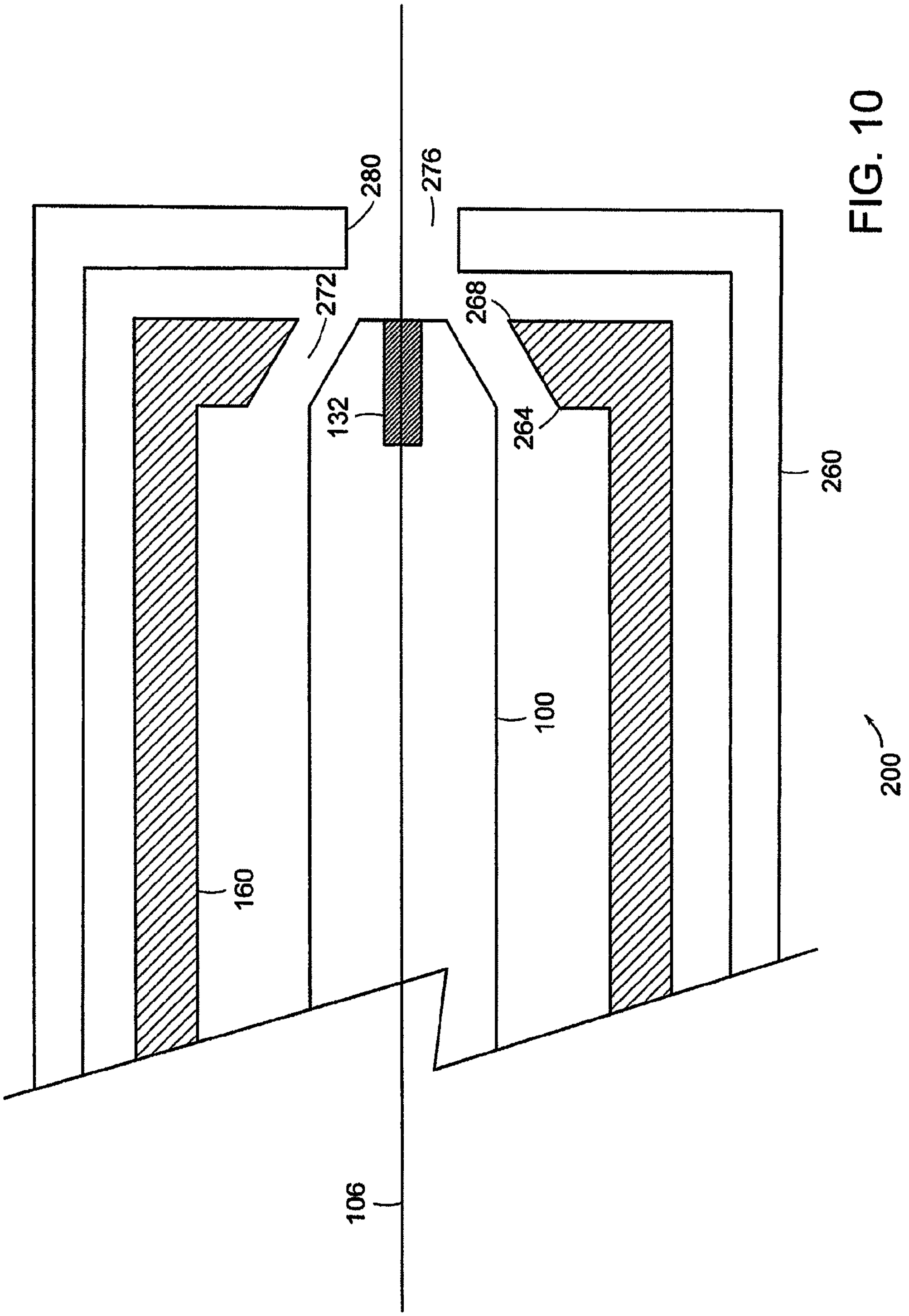
FIG. 10 is a partial cross-section of an assembly for use in a plasma arc torch incorporating principles of the present invention.

FIG. 10 is an illustration of an assembly 200 for use in a plasma arc torch employing the principles of the present invention. The assembly 200 includes a nozzle 260 mounted in a torch body of a torch (not shown). The nozzle 260 has an exit orifice 280. The assembly 200 also includes an electrode 100 mounted in the torch body. The electrode 100 includes an insert 132 that is press fit into a bore of the electrode 100. The assembly 200 also includes a component 160 mounted in the torch body relative to the nozzle 260. The component 160 defines at least one passage 272. The passage 272 has a first opening 264 and a second opening 268. In this embodiment, the passage 272 is a tapered orifice, tapering from the first opening 264 towards the second opening 268. The passage 272 directs a flow of electrode gas from the first opening 264 toward the second opening 268 to a location adjacent the insert 132 of the electrode 100. In this embodiment, the nozzle 260, component 160 and the electrode 100 are collinearly disposed relative to a longitudinal axis 106 such that the nozzle exit orifice 280, the passage 272, and the insert 132 of the electrode are concentric relative to each other.

Figure 11A:
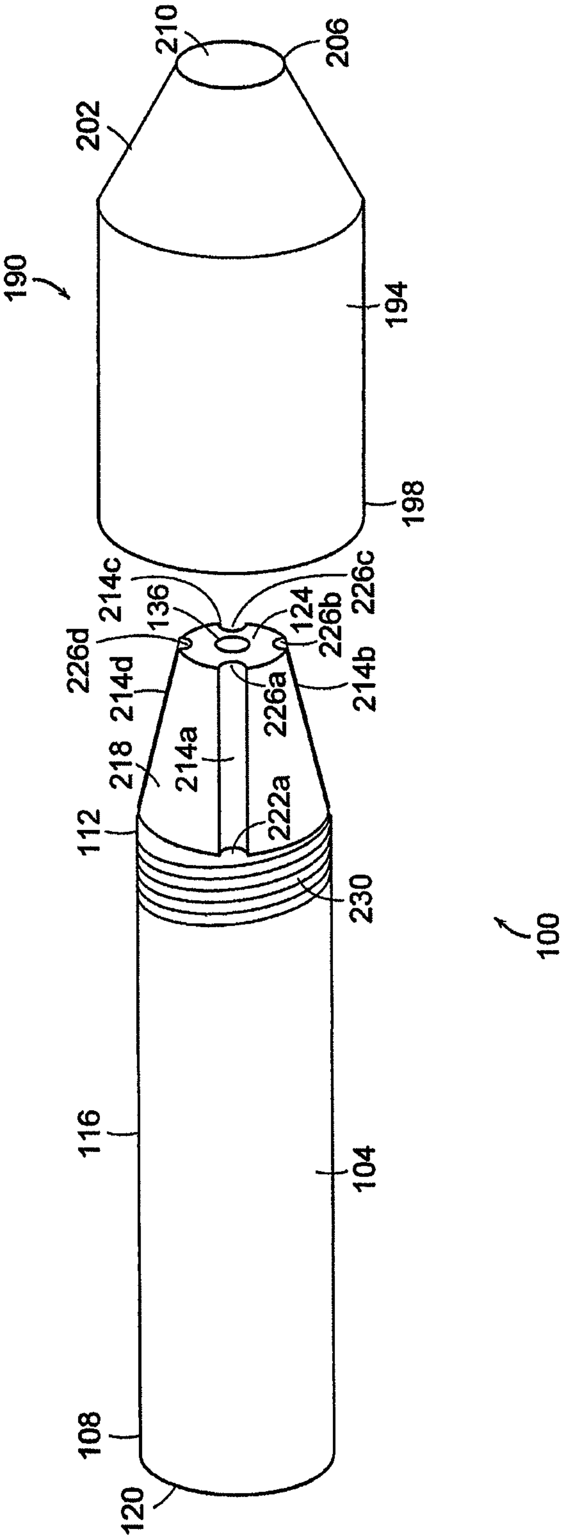
FIG. 11A is an exploded perspective view of an embodiment of an electrode according to the invention.
Figure 11B:
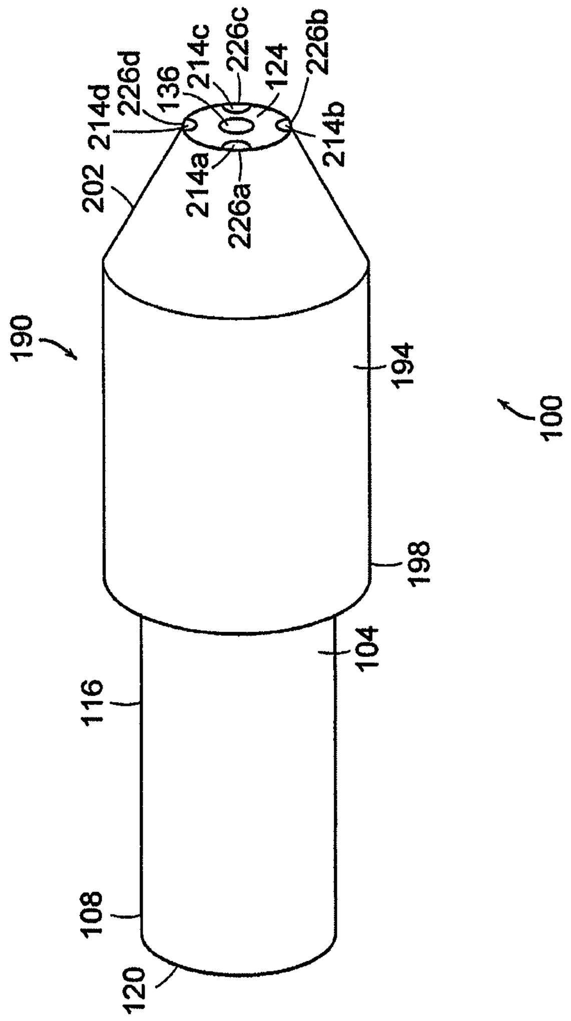
FIG. 11B is an assembly view of an embodiment of an electrode according to the invention.

In another embodiment of the invention, illustrated in FIGS. 11A and 11B, the electrode 100 is formed by joining a cap 190 to a body 104. The cap 190 has a generally cylindrical body 194. The body 194 has a first end 198 defining a first opening (not shown) and a second end 202 defining a second opening 206. The body 194 is a hollow body with a passage 210 extending from the first opening (not shown) to the second opening 206. By way of example, the cap 190 may be formed of a high temperature material (e.g., graphite) or a high thermal conductivity material (e.g., copper). In this embodiment, the cap 190 also has a series of threads (not shown) located on a portion of the walls of the passage 210 of the cap 190.

Referring to FIG. 11A, the body 104 of the electrode 100 has four channels, 214*a*, 214*b*, 214*c* and 214*d* (generally 214) on an outer surface 218 of the second end 112 of the body 104 of the electrode 100. In this embodiment the channels 214 have the shape of a section of a circle when viewed from the end face 124 of the second end 112 of the body 104. The channels 214 can have, alternatively, a different shape when viewed from the end face 124 of the second end 112 of the body 104. For example, the channels 214 can have the shape of a triangle, a section of a square, or a section of an ellipse when viewed from the end face 124. The channels 214*a*, 214*b*, 214*c* and 214*d* each have a first opening 222*a*, 222*b*, 222*c* and 222*d* (generally 222), respectively. For clarity of illustration, the openings 222*b*, 222*c* and 222*d* are not shown. The first openings 222 are located at the second end 112 of the body. The channels 214*a*, 214*b*, 214*c* and 214*d* also each have a second opening 226*a*, 226*b*, 226*c* and 226*d* (generally 226), respectively. The second openings 226 are located in the end face 124 of the second end 112 of the body 104 of the electrode 100. The body 104 has a series of threads 230 on the outer surface 116 of the body 104. The threads 230 are located adjacent the second end 112 of the body 104. The threads 230 are capable of mating with the threads located on the wall of the passage 210 of the cap 190.

Referring to FIG. 11B, the cap 190 is screwed onto the second end 112 of the body 104 in such a way as to secure the cap 190 to the body 104 by the union of the threads 230 on the body 104 with mating threads on the wall of the passage 210 of the cap 190. The cap 190 and body 104 are dimensioned such that a planar surface defined by the end face 124 of the body 104 is generally coplanar with a plane defined by the opening 206 of the cap 190. By joining the cap 190 to the body 104, passages are created in the electrode 100. The passages are substantially similar to, for example, the passages 140 of FIGS. 3A and 3B.

Figure 12:
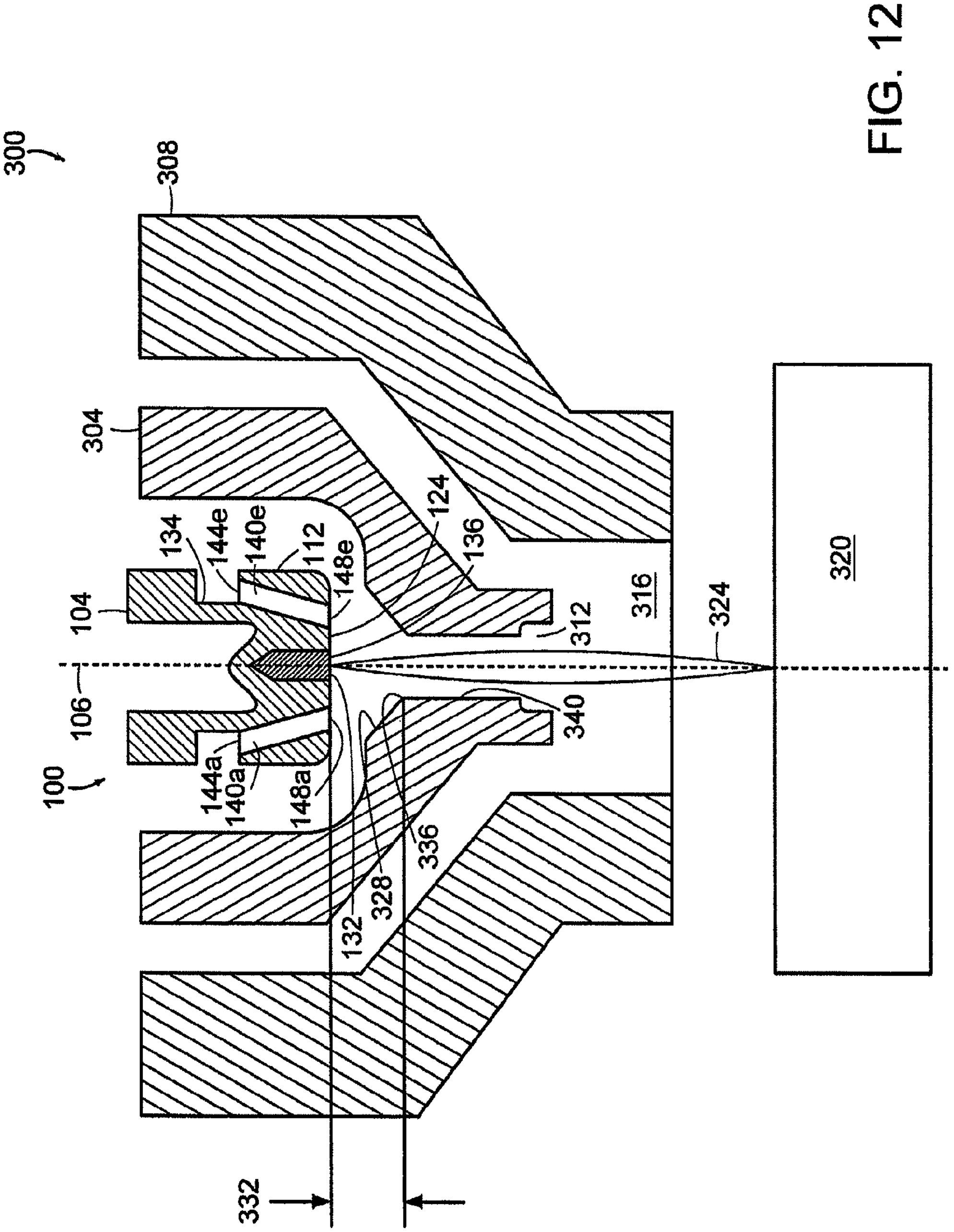
FIG. 12 is a simplified cross-sectional view of an electrode and a nozzle installed in a torch tip, according to an illustrative embodiment of the invention.

FIG. 12 is an illustration of a plasma arc torch tip 300 employing the principles of the present invention in the transferred arc mode of a plasma arc torch. This mode is characterized by the emission of a transferred plasma arc 324 from the emission surface 136 of an insert 132 of an electrode, such as the electrode 100 of FIGS. 3A and 3B, to a workpiece 320. The plasma arc 324 passes through an exit orifice 312 of a nozzle 304 and a shield orifice 316 of a shield 308 to make electrical contact with the workpiece 320. The nozzle 304, the shield 308, and the electrode 100 are collinearly disposed relative to a longitudinal axis 106 such that the nozzle exit orifice 312, the shield orifice 316, and the emission surface 136 of the insert 132 located in the electrode 100 are concentric relative to each other.

With reference to FIG. 12, the electrode 100 has eight passages 140 (140*a* and 140*e* shown; 140*b*, 140*c*, 140*d*, 140*f*, 140*g* and 140*h* not shown) in the body 104 of the electrode 100. Each passage 140 has a respective first opening 144 in the body 104 and a respective second opening 148 in the second end 112 of the body 104 of the electrode 100. The passages 140 facilitate the flow of electrode gas through the body 104 of the electrode 100 to a location adjacent the emission surface 136 of the insert 132. In this embodiment, the electrode gas flow is directed substantially towards the plasma arc 324 rather than towards an inside wall 328 of the nozzle 304. The electrode gas flow is directed into an opening 336 in the nozzle 304 and out of the nozzle exit orifice 312.

It has been determined that the electrode gas flowing out of the passages 140 increases the axial momentum of the plasma arc 324. Increasing the axial momentum of the plasma arc 324 has been shown to promote faster cutting and better cut quality. Accordingly, in some embodiments, various parameters (e.g., passage shape and quantity, and gas flow rate) associated with the invention are selected to increase the axial momentum of the electrode gas flowing out of the passages 140. For example, in some embodiments, the number of passages 140 and the location of the second openings 148 are selected to increase the axial momentum of the plasma arc 324. In this manner, an operator may, for example, increase the speed at which the plasma torch is used to cut a piece of metal while maintaining and/or improving cut quality.

A nozzle-electrode gap 332 between the end face 124 of the electrode 100 and the entrance 336 of the nozzle orifice 340 can be selected, for example, to increase electrode life, improve cut quality and/or reduce wear of the bore of the nozzle. By way of illustration, an experiment was conducted to demonstrate the effects of varying the length of the nozzle-electrode gap 332. Eight passages 140 were formed in the body of an electrode, for example, the electrode 100 of FIGS. 3A and 3B. The passages 140 each had a diameter of about 1.04 mm located at an angle of about 22° relative to the longitudinal axis 106 of the electrode 100. In operation in a torch, for equivalent operating conditions, a nozzle-electrode gap 332 of about 3.0 mm exhibited improved cut quality relative to a nozzle-electrode gap 332 of about 3.8 mm. In another experiment, for equivalent operating conditions, nozzle-electrode gaps of about 3.0 mm and about 3.8 mm exhibited less nozzle bore wear and longer electrode life relative to a nozzle-electrode gap 332 of about 2.3 mm.

Figure 13:
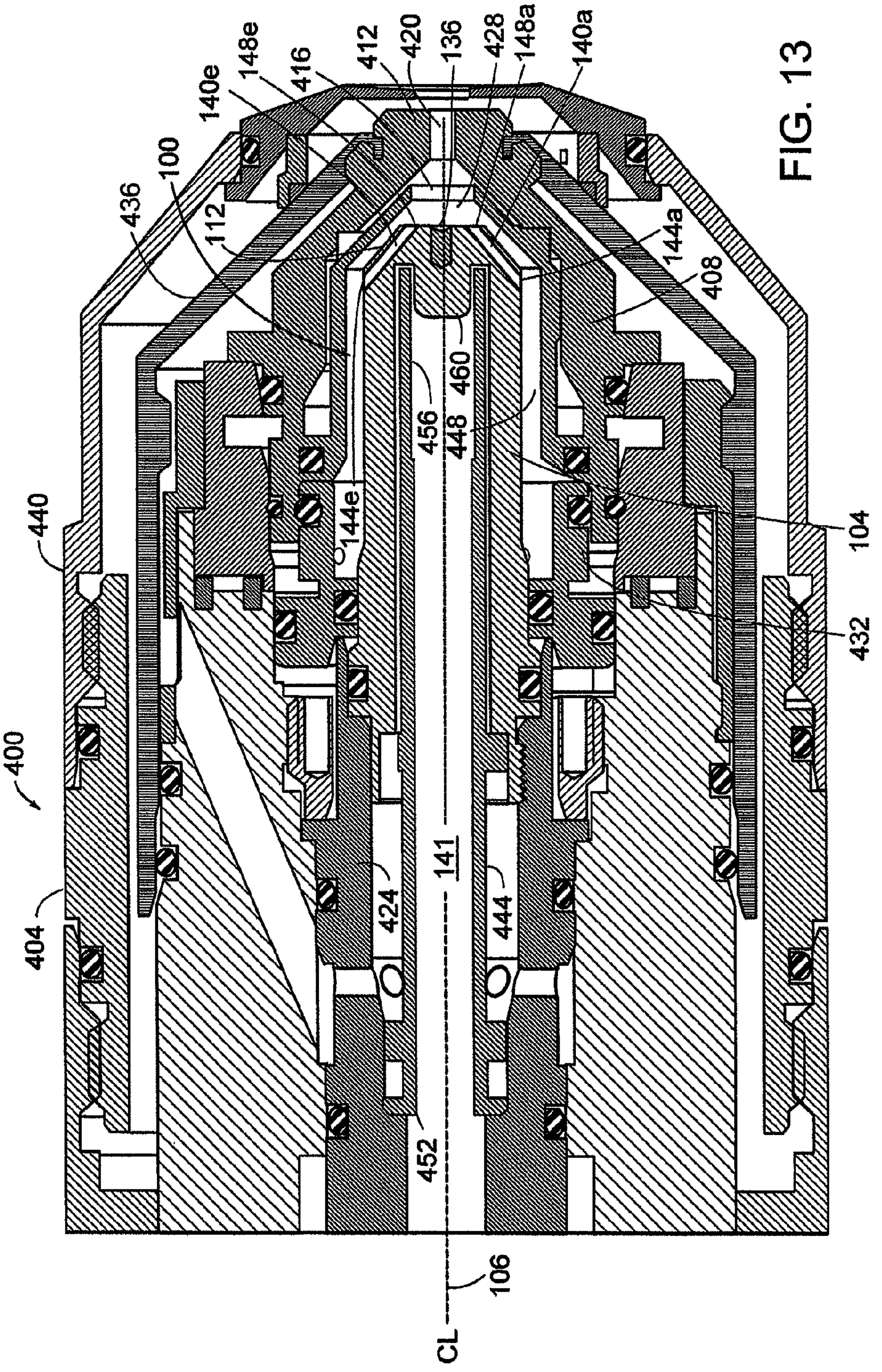
FIG. 13A is a partial cross-section of a plasma arc torch incorporating an electrode of the invention.
FIG. 13B is a partial cross-section of a plasma arc torch incorporating an electrode of the invention.
Figure 13A:
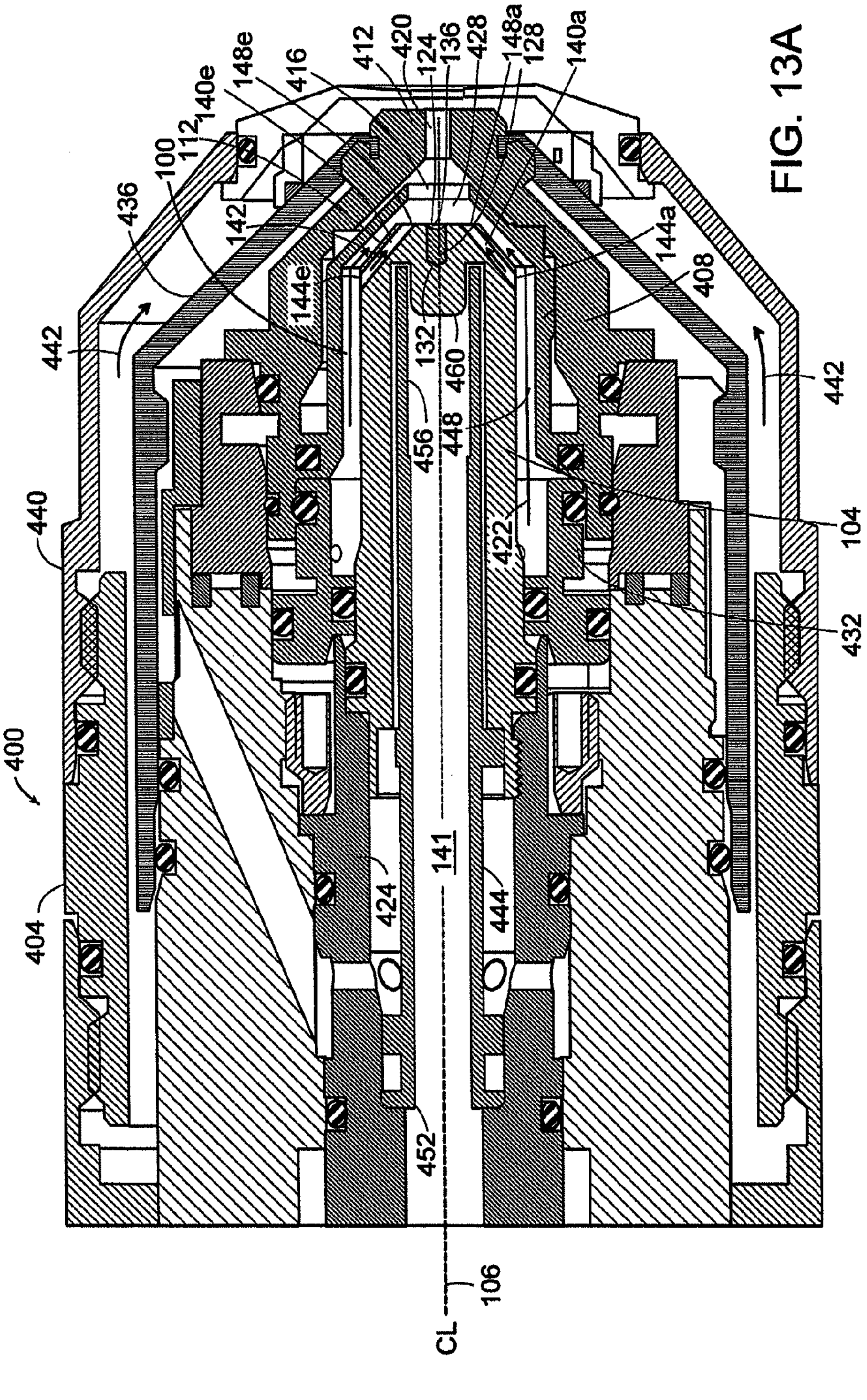

FIG. 13A shows a portion of a high-definition plasma arc torch 400 that can be utilized to practice the invention. The torch 400 has a generally cylindrical body 404 that includes electrical connections, passages for cooling fluids and arc control fluids. An anode block 408 is secured in the body 404. A nozzle 412 is secured in the anode block 408 and has a central passage 416 and an exit passage 420 through which an arc can transfer to a workpiece (not shown). An electrode, such as the electrode 100 of FIGS. 3A and 3B, is secured in a cathode block 424 in a spaced relationship relative to the nozzle 412 to define a plasma chamber 428. Plasma gas 422 fed from a swirl ring 432 is ionized in the plasma chamber 428 to form an arc. A water-cooled cap 436 is threaded onto the lower end of the anode block 408, and a secondary cap 440 is threaded onto the torch body 404. The secondary cap 440 acts as a mechanical shield against splattered metal during piercing or cutting operations. Secondary gas 442, also referred to as shield gas, flows proximal to the secondary cap 440.

A coolant tube 444 is disposed in the hollow interior 448 of the electrode 100. The tube 444 extends along a centerline or longitudinal axis 106 of the electrode 100 and the torch 400 when the electrode 100 is installed in the torch 400. The tube 444 is located within the cathode block 424 so that the tube 444 is generally free to move along the direction of the longitudinal axis 106 of the torch 400. A top end 452 of the tube 444 is in fluid communication with a coolant supply (not shown). The flow of coolant travels through the passage 141 and exits an opening located at a second end 456 of the tube 444. The coolant impinges upon the interior surface 460 of the second end 112 of the electrode 100 and circulates along the interior surface of the electrode body 104.

In operation, a flow of electrode gas 142 is directed into the first openings 144 located in the body 104 of the electrode 100, along the passages 140, and out of the second openings 148 located in the second end 112 of the body 104 of the electrode 100. The electrode gas 142 flows out of the second openings 148 adjacent the emission surface 136 of an emission insert 132. The flow of electrode gas 142 is directed towards the plasma arc (not shown) and through the central passage 416 and the exit passage 420 of the nozzle 412 and through an exit orifice of a shield towards the workpiece (not shown). As shown in FIG. 13A, the electrode gas 142 flowing through the passageways 140 and the plasma gas 422 are a single gas coming from the same source. In other embodiments, the electrode gas and the plasma gas each has a distinct source and, optionally, are different gases or have different gas concentrations.

Oxidizing gases (e.g., air or oxygen) in the vicinity of the electrode 100, for example, about the emission surface 136 of the insert 132 contribute to poor electrode life. To improve electrode 100 life alternative non-reactive gases, a combination of oxidizing and non-oxidizing gases, or a gas that is a mixture of oxidizing and non-oxidizing gases are directed as electrode gas 142 through the passages 140. In an embodiment where a combination of oxidizing and non-oxidizing gases are directed as electrode gas 142, for example, a non-oxidizing gas flows through passage 140*a* and an oxidizing gas flows through passage 140*e*. Suitable non-reactive gasses include non-oxidizing gas such as, for example, nitrogen, argon, hydrogen, helium, hydrocarbon fuels, or any mixture of these. Hydrocarbon fuels include, for example, methane and propane.

Figure 13B:
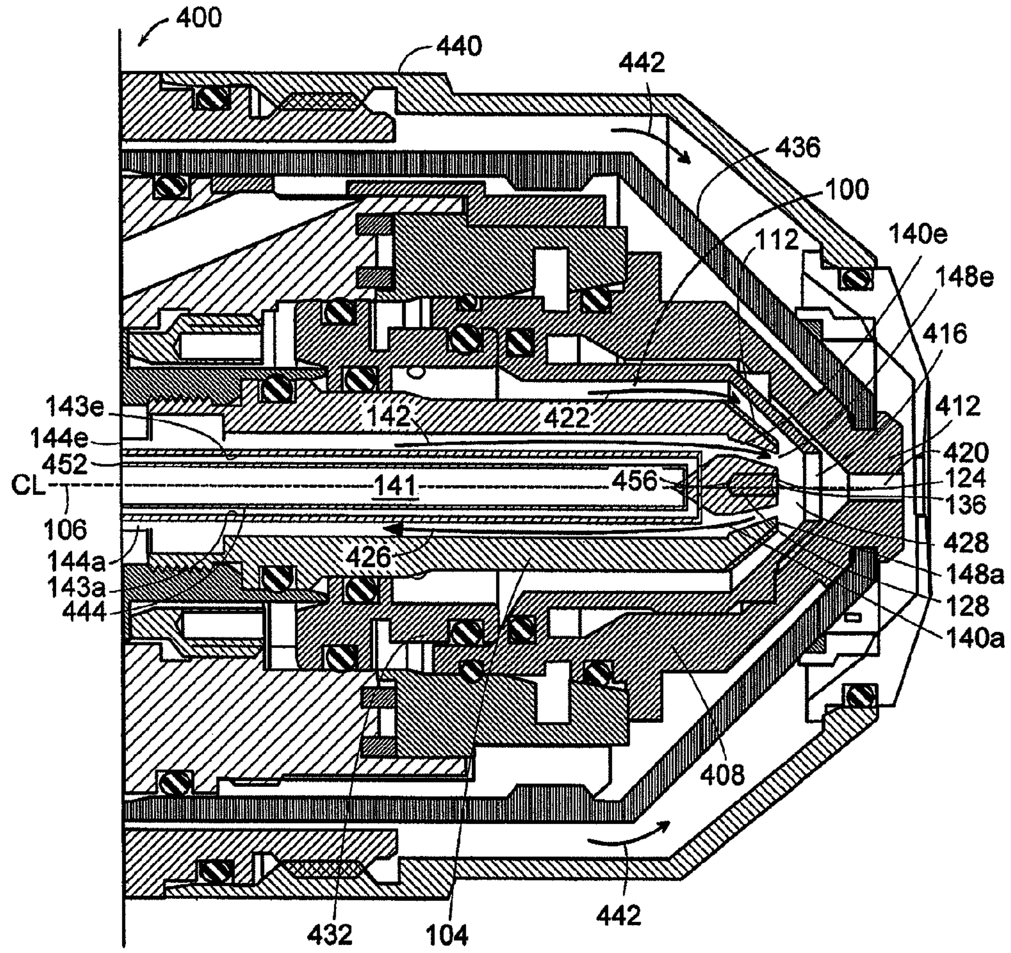

FIG. 13B shows a portion of a high-definition plasma arc torch 400 in which an electrode, such as the electrode 100 of FIGS. 5 and 8, is secured in a cathode block 424 in a spaced relationship relative to the nozzle 412 to define a plasma chamber 428. A coolant tube 444 is disposed in the hollow interior 448 of the electrode 100. The tube 444 extends along a centerline or longitudinal axis 106 of the electrode 100 and the torch 400 when the electrode 100 is installed in the torch 400. The tube 444 is located within the cathode block 424 so that the tube 444 is generally free to move along the direction of the longitudinal axis 106 of the torch 400. A top end 452 of the tube 444 is in fluid communication with a coolant supply (not shown). The flow of coolant travels through the passage 141 and exits an opening located at a second end 456 of the tube 444. The coolant impinges upon the a wall 143 of passage 140 (e.g., 140*a* and 140*e*) and circulates between a wall of tube 444 and a wall 143 of passage 140.

In operation, a flow of electrode gas 142 is directed into the first openings 144 located in the body 104 of the electrode 100, along the passages 140, and out of the second openings 148 located in the second end 112 of the body 104 of the electrode 100. The electrode gas 142 flows out of the second openings 148 adjacent the emission surface 136 of an emission insert 132. The flow of electrode gas 142 is directed towards the plasma arc (not shown) and through the central passage 416 and the exit passage 420 of the nozzle 412 and through an exit orifice of a shield towards the workpiece (not shown). The electrode gas 142 and the plasma gas 422 can be the same gas or can be different from one another. The electrode gas 142 and the plasma gas 422 can flow from the same source (e.g., vessel or line) (not shown). In one embodiment, the electrode gas 142 flowing through the passageways 140 has one source and the plasma gas 422 has another source (not shown). The electrode gas 142 flows through passages 140 whereas the plasma gas 422 does not flow through the passages 140.

The passages 140 can be employed to vent plenum gas 426. The passages 140 vent the plenum gas 426 and the vented plenum gas flows from the second opening 148 to the first opening 144. The passages 140 can vent the plenum gas 426 at or near the source of the gas (not shown). Alternatively, the passages 140 can vent the plenum gas 426 at one or more locations between the gas source and the plasma chamber 428 (not shown). In one embodiment, the electrode 100 features multiple passages 140 and some of the passages 140 flow electrode gas 142 from the first opening 144 to the second opening 148 while, concurrently, other of the passages 140 vent plenum gas 426 in the plasma arc torch (e.g., in the plasma chamber 428).

In another embodiment, one or more of the passages 140 flow electrode gas 142 from the first opening 144 to the second opening 148. Upon extinguishing the plasma arc, one or more of the passages 140 vent plenum gas 426, which flows from the second opening 148 in the direction of the first opening 144.

In order to enable the passages 140 to vent, one or more vent valves and/or vent plugs expose the passages 140 to an atmosphere with a pressure lower than the pressure of, for example, the plenum gas 426. Suitable lower pressures can include, for example, atmospheric pressure or vacuum pressure.

The plenum gas valve system can be a mechanical valve that prevents the plenum gas 426 from venting and enables the plenum gas 426 to vent through passages 140. Alternatively, the plenum gas valve system can be proportional valves that meter the plenum gas 426 to enable a desired venting rate to be achieved. The controller can control venting of the plenum gas from the plasma arc torch via one or more passages 140. For example, the controller controls when the vent valve opens, how much the vent valve opens, and/or the flow of the vented plenum gas 426 through the passages 140. The controller can control how quickly the plenum gas 426 vents from the plasma arc torch via the passages 140.

Exposing the plasma arc torch to relatively high pressure can adversely impact electrode and nozzle life. Venting plenum gas 426 from the electrode to a lower pressure system (e.g., atmospheric pressure) via the passages 140 can improve electrode and nozzle life.

Plasma arc systems are widely used for cutting metallic materials and can be automated for automatically cutting a metallic workpiece. In one embodiment, referring to FIGS. 13A, 13B, 14A, and 14B, a plasma arc torch system includes a computerized numeric controller (CNC) 552, display screen 553, a power supply 510, an automatic process controller 536, a torch height controller 538, a drive system 540, a cutting table 542, a gantry 526, a gas supply (not shown), a controller 500, a positioning apparatus (not shown), and a plasma arc torch 400. The plasma arc torch system optionally includes a valve console 520. The plasma arc torch 400 torch body 404 includes a nozzle 412 and an electrode 100 with one or more passages 140. In operation, the tip of the plasma arc torch 400 is positioned proximate the workpiece 530 by the positioning apparatus.

The controller 500 controls the flow of electrode gas through one or more passages 140 in the electrode 100. The controller can be disposed on the power supply 510, for example, the controller can be housed within the power supply 510, see FIG. 14B. Alternatively, the controller 500 can be disposed exterior to the power supply 510 housing, for example, on the exterior of the power supply housing. In one embodiment, see FIG. 14A, the controller 500 is connected to a component, for example, a power supply 510. Similarly, the valve console 520 can be disposed on the power supply 510, for example, the valve console 520 can be housed within the power supply 510, see FIG. 14B. The valve console 520 can also be disposed exterior to the power supply 510 housing, for example, on the exterior of the power supply housing. In one embodiment, see FIG. 14A, the valve console 520 is connected to a component, for example, a power supply 510. The valve console 520 can contain the valves for flowing in and/or venting out the plasma gas, electrode gas, shield gas, and other gases, for example.

In operation, a user places a workpiece 530 on the cutting table 542 and mounts the plasma arc torch 400 on the positioning apparatus to provide relative motion between the tip of the plasma arc torch 400 and the workpiece 530 to direct the plasma arc along a processing path. The torch height control 538 sets the height of the torch 400 relative to the work piece 530. The user provides a start command to the CNC 552 to initiate the cutting process. The drive system 540 receives command signals from the CNC 552 to move the plasma arc torch 400 in an x or y direction over the cutting table 542. The cutting table 542 supports a work piece 530. The plasma arc torch 400 is mounted to the torch height controller 538 which is mounted to the gantry 526. The drive system 540 moves the gantry 526 relative to the table 542 and moves the plasma arc torch 400 along the gantry 526.

The CNC 552 directs motion of the plasma arc torch 400 and/or the cutting table 542 to enable the workpiece 530 to be cut to a desired pattern. The CNC 552 is in communication with the positioning apparatus. The positioning apparatus uses signals from the CNC 552 to direct the torch 400 along a desired cutting path. Position information is returned from the positioning apparatus to the CNC 552 to allow the CNC 552 to operate interactively with the positioning apparatus to obtain an accurate cut path.

The power supply 510 provides the electrical current necessary to generate the plasma arc. The main on and off switch of the power supply 510 can be controlled locally or remotely by the CNC 552. Optionally, the power supply 510 also houses a cooling system for cooling the torch 400.

The controller 500 controls the electrode gas flow as a function of a plasma arc torch 400 parameter. The plasma arc torch parameter can include the plasma arc current, voltage, plasma gas pressure, shield gas pressure, electrode gas pressure, plenum gas pressure, plasma gas flow, shield gas flow, electrode gas flow, plenum gas flow, timed sequence, or any combination of these. The plasma arc torch parameter can be a rising, falling, or steady state threshold.

The controller can be used in conjunction with a hand torch, mechanized torch, or other suitable plasma arc torch. In one embodiment, the plasma arc torch system includes a controller disposed on a hand torch power supply, for example, within the housing of the power supply or exterior to the housing of the power supply that is connected to the hand torch by, for example, a lead. In another embodiment, the plasma arc torch system includes a controller 500 connected to a hand torch by, for example, one or more leads between the power supply and the hand torch.

The plasma arc torch parameter can be a predetermined current and/or the current during any point in the plasma arc cycle. For example, the plasma arc torch parameter can be the current before initiating the plasma arc, the current upon initiating the plasma arc, the current during delivery of the plasma arc (e.g., at steady state), the current before extinguishing the plasma arc, the current upon extinguishing the plasma arc, or any combination of these.

The plasma arc torch parameter can be a predetermined voltage and/or the voltage during any point in the plasma arc cycle. For example, the plasma arc torch parameter can be the voltage before initiating the plasma arc, the voltage upon initiating the plasma arc, the voltage during delivery of the plasma arc, the voltage before extinguishing the plasma arc, the voltage upon extinguishing the plasma arc, or any combination of these.

The plasma arc torch parameter can be a predetermined pressure and/or the pressure during any point in the plasma arc cycle. The pressure can be the pressure of the plasma gas, the pressure of the shield gas, the pressure of the electrode gas, the pressure of the plenum gas, or the pressure of a combination of one or more of these. For example, the plasma arc torch parameter can be the pressure before initiating the plasma arc, the pressure upon initiating the plasma arc, the pressure during delivery of the plasma arc, the pressure before extinguishing the plasma arc, the pressure upon extinguishing the plasma arc, or any combination of these.

The plasma arc torch parameter can be a predetermined flow rate and/or the flow rate during any point in the plasma arc cycle. The flow rate can be the plasma gas flow rate, the shield gas flow rate, the electrode gas flow rate, the plenum gas flow rate including the flow rate of the plenum gas when it vents from the plasma arc torch, or the flow rate of a combination of one or more of these. For example, the plasma arc torch parameter can be the flow rate before initiating the plasma arc, the flow rate upon initiating the plasma arc, the flow rate during delivery of the plasma arc, the flow rate before extinguishing the plasma arc, the flow rate upon extinguishing the plasma arc, or any combination of these.

The plasma arc torch parameter can be a predetermined timed sequence such as, for example, an interval of time programmed into the controller. Alternatively, a timed sequence can be determined by a look-up table or other reference that dictates the timed sequence. The timed sequence can be a number of seconds before or after any point in the plasma arc cycle, such as, for example, initiating the plasma arc, upon initiating the plasma arc, during delivery of the plasma arc, before extinguishing the plasma arc, upon extinguishing the plasma arc, or any combination of these. In one embodiment, the timing of the timed sequence is dependent upon a predetermined timed sequence that is initiated at, for example, the start signal. The plasma arc torch parameter can be a sequence that is defined by the user according to the specific torch, power supply, work piece, work piece design, work piece material characteristics (e.g., thickness), cut speed, and/or gas type (e.g., plasma, electrode, shield gas, or combination of one or more gases) and is programmed into the controller. Suitable plasma arc torch parameters are determined by, for example, the selected torch, the cutting application, and/or the power supply.

The controller 500 can provide the electrode gas flow through one or more passages 140 at any point in the plasma arc cycle. For example, the controller 500 provides the electrode gas flow before initiating the plasma arc, upon initiating the plasma arc, during delivery of the plasma arc, before extinguishing the plasma arc, upon extinguishing the plasma arc, or any combination of these. In one embodiment, the controller 500 controls an electrode gas valve system (not shown) that prevents electrode gas flow and enables electrode gas flow through one or more passage 140. The electrode gas valve system can be a mechanical valve that prevents the electrode gas flow and enables the electrode gas flow through passages 140. Alternatively, the electrode gas valve system can be proportional valves that meter the flow to enable a desired flow rate to be achieved.

The controller 500 enables and/or controls the flow of electrode gas about an end 112 of the electrode 100. For example, the controller 500 enables and/or controls the flow of electrode gas about the insert 132. Optionally, the electrode gas surrounds at least a portion of the insert 132. In some embodiments, the electrode gas forms an electrode gas envelope about an end 112 of the electrode, for example, about the insert 132.

Referring now to FIGS. 12 and 13A, the electrode 100 can be mounted in a mutually spaced relationship to form a plasma chamber 428 at an end of the torch body 404. In another embodiment, a retaining cap such as, for example, a water cooled cap 436 is mounted on the torch body 404. The retaining cap encloses at least a portion of an outer surface of the nozzle 412. For example, the retaining cap substantially encloses the outer surface of nozzle 412. In another embodiment, a secondary cap 440 acts as a shield and has a central circular opening aligned with the nozzle 412. In one embodiment, a bore 128 is disposed in the second end 112 of the electrode body 100, an insert 132 is located within the bore 128, and an end face 124 of the insert 132 is located adjacent the second opening 148 of at least one of the passages 140.

Figure 14A:
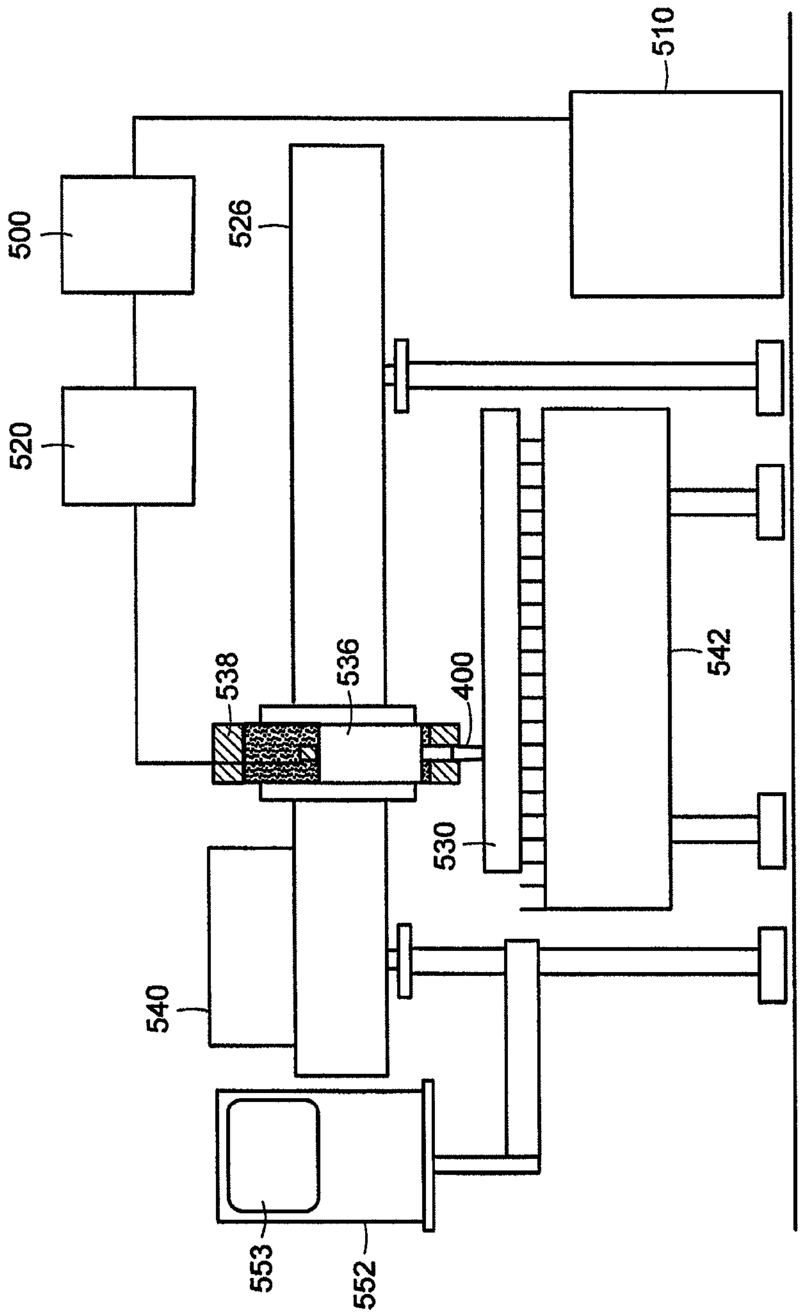
FIG. 14A is a schematic diagram of an automated plasma arc torch system.
Figure 14B:
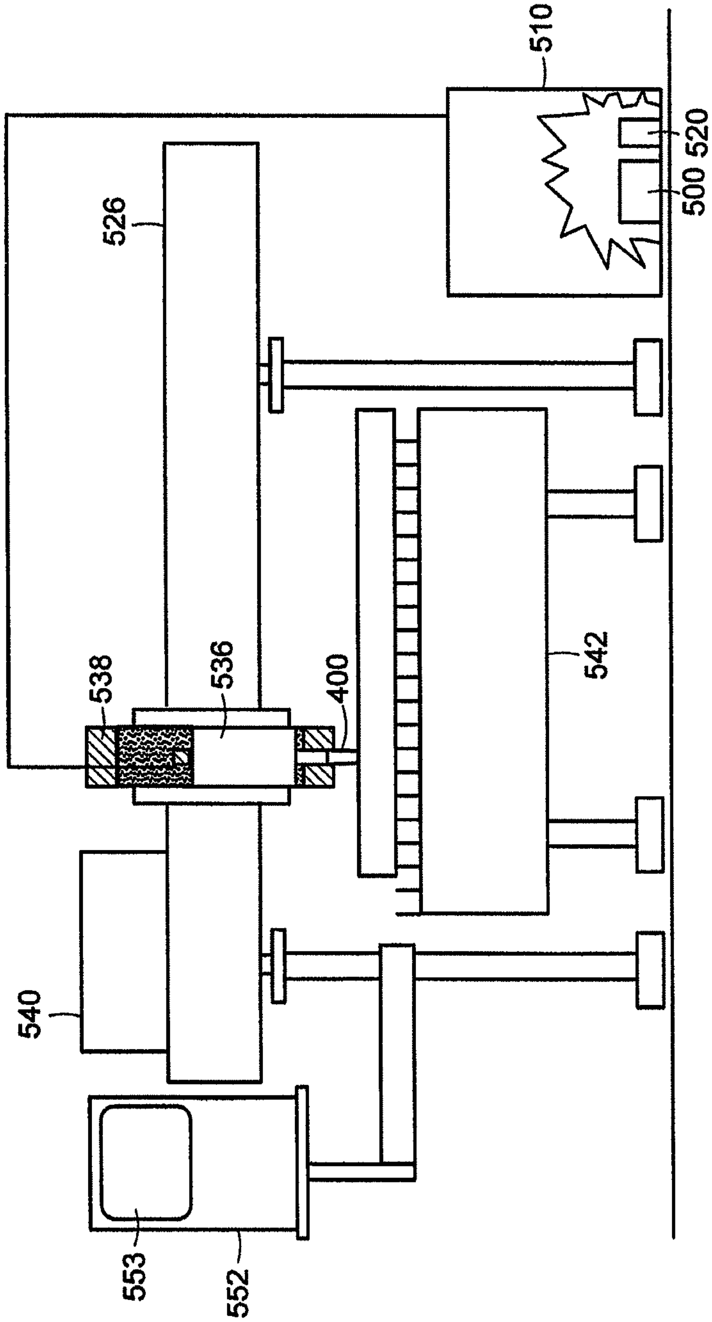
FIG. 14B is a schematic diagram of an automated plasma arc torch system.

In one embodiment, referring now to FIGS. 13A and 14B, the controller 500 controls a plasma gas valve system (not shown) that prevents plasma gas flow and enables plasma gas flow through the plasma chamber 428. The plasma gas valve system can be a mechanical valve that prevents plasma gas flow and enables plasma gas flow to the plasma chamber 428. Alternatively, the plasma gas valve system can be proportional valves that meter the flow to enable a desired flow rate to be achieved. The plasma gas can be a reactive gas, for example, an oxidizing gas, and the electrode gas can be non-reactive gas, for example, a non-oxidizing gas. In one embodiment, the plasma gas is oxygen and the electrode gas is nitrogen. In one embodiment, the plasma gas and the electrode gas contact one another in the plasma chamber 428. The plasma gas and the electrode gas are in separate streams prior to when they contact one another in the plasma chamber 428. In one embodiment, the plasma gas and the electrode gas contact one another prior to entering the plasma chamber 428.

In one embodiment, a plasma arc torch includes a torch body 404 connected to a power supply 510. The torch body 404 includes a plasma flow path for directing a plasma gas to a plasma chamber 428 where a plasma arc is formed. An electrode 100 mounted in the torch body includes at least one passage 140 extending from a first opening 144 located in the electrode 100 body 104 to a second opening 148 located at the second end 112 of the electrode 100. A controller 500 controls the electrode gas flow through at least one of the passages 140 as a function of a plasma arc torch parameter. The electrode gas flows from a first opening 144 to a second opening 148. A nozzle 416 can be mounted relative to the electrode 100 in the torch body 404 to define the plasma chamber 428. In one embodiment, a bore 128 is disposed in the second end 112 of the electrode body 100 and an insert 132 is located within the bore 128. An end face 124 of the insert 132 is located adjacent the second opening 148.

In one embodiment, an insert 132 is formed of a high thermionic emissivity material, for example, tungsten or hafnium. The controller 500 enables and/or controls the flow of electrode gas about the insert 132. Optionally, the electrode gas surrounds at least a portion of the insert 132 and in some embodiments forms an electrode gas envelope about the insert 132. The controller 500 can control an electrode gas valve system to enable electrode gas to flow through at least one of the passages. Alternatively or in addition, the controller 500 can control a plasma gas valve system to enable plasma gas to flow through the plasma chamber 428.

A method for operating a plasma arc torch system includes providing an electrode 100 mounted in a mutually spaced relationship with a nozzle 412, such that the electrode 100 and the nozzle 412 define a plasma chamber 428. The electrode 100 has at least one passage 140 extending from a first opening 144 in the body 104 to a second opening 148 in the end face of the electrode. The method also includes, directing a plasma gas through the plasma chamber 428 where a plasma arc is formed, directing an electrode gas through at least one of the passages 140, and controlling the electrode gas flow through at least one of the passages 140 as a function of a plasma arc torch parameter.

In one embodiment, the electrode gas flows about the insert 132 located within a bore 128 disposed in the second end 112 of the electrode 100. Optionally, the electrode gas flow surrounds at least a portion of the second end 112 of the electrode. For example, the electrode gas flow surrounds at least a portion of the insert 132.

In another embodiment, the method includes controlling an electrode gas valve system (not shown) to enable the electrode gas to flow through at least one of the passages 140. Alternatively or in addition the method includes controlling a plasma gas valve system to enable the plasma gas to flow through the plasma chamber. The plasma gas can include reactive gases, for example, oxidizing gases such as oxygen or air. The electrode gas can include non-reactive gases, for example, non oxidizing gases such as nitrogen, argon, hydrogen, helium, hydrocarbon fuels, or any mixture thereof. The electrode gas can also include mixtures of non-reactive gases and reactive gases. In some embodiments, a non-oxidizing gas flows through one passage 140*a* and an oxidizing gas or a mixture of oxidizing and non-oxidizing gas flows through another passage 140*e* in the electrode 100.

The electrode gas can be selected by, for example, the gas ionization energy. In one embodiment, the electrode gas ionization energy is varied through the cycle of the plasma arc torch. For example, an electrode gas having a relatively low ionization energy is selected and is flowed through one or more passages 140 at torch start up. Optionally, a relatively high ionization energy electrode gas is selected and is flowed through one or more passages 140 when the plasma arc torch is delivering a plasma arc. The ionization energy of each electrode gas that is flowed through the passages 140 can impact the plasma arc torch energy requirement. For example, reducing the required energy can increase the life of the torch nozzle, shield, swirl ring, and other consumable torch parts. Multiple electrode gases can be mixed prior to entering the passages 140. Alternatively, or in addition, one ionization energy level gas flows through one passage (e.g., 140*a*) and another ionization energy level gas flows through another passage (e.g., 140*e*). By combining selected ionization energy level gases after they flow through the passages 140, the desired ionization level can be achieved at the work piece. Gases having suitable ionization levels include, for example, oxygen, air, and noble gases such as, for example, helium, neon, or argon.

The plasma arc torch, the electrode 100 having passages 140, the controller, and other aspects of what is described herein can be implemented in cutting systems, welding systems, spray coating systems, and other suitable systems known to those of ordinary skill in the art. Variations, modifications, and other implementations of what is described herein will occur to those of ordinary skill without departing from the spirit and the scope of the invention. Accordingly, the invention is not to be defined only by the preceding illustrative description.

What is claimed is:

1. An electrode for a plasma arc torch, the electrode comprising:

an electrode body having a first end and a second end and an end face disposed at the second end, the end face defining an edge;

an insert disposed in the second end with an emission surface for emitting a plasma arc, the insert defining a perimeter, wherein during operation of the electrode a plasma arc emission is confined within the perimeter of the insert; and at least one electrode gas flow means formed in the electrode body with a first opening at an outer surface of the electrode body and a second opening between the edge and the perimeter to provide an electrode gas flow that surrounds the emission surface during operation of the plasma arc torch to reduce a swirl strength of a plasma gas flow in a region of the plasma arc.

2. The electrode of claim 1 wherein the insert is formed of a high thermionic emissivity material.

3. The electrode of claim 2 wherein the high thermionic emissivity material comprises hafnium.

4. An electrode for a plasma arc torch comprising:

an electrode body having a first end and a second end, the second end of the electrode body having an end face;

a bore disposed in the second end of the electrode body;

an insert formed of hafnium in the bore and comprising an emission surface such that during operation of the plasma arc torch at least a portion of the emission surface becomes molten and a plasma arc is emitted from the emission surface; and at least one passage extending from a first opening in the electrode body to a second opening between a perimeter of the insert and an edge defined by the end face adjacent the bore, such that as an electrode gas flows through the at least one passage the electrode gas surrounds the molten emission surface as the electrode gas exits the second opening and reduces ejection of the molten emission surface.

5. The electrode of claim 4 wherein the electrode gas comprises a non-oxidizing gas.

6. The non-oxidizing gas of claim 5 comprising nitrogen, argon, hydrogen, helium, or hydrocarbon fuels.

7. An electrode for a plasma arc torch, the electrode comprising:

an electrode body having a first end and a second end, the second end of the electrode body having an end face, the end face defining an edge;

a bore disposed within the second end;

an insert disposed in the bore and defining a perimeter, the insert having an emission surface such that during operation of the plasma arc torch a plasma arc emission is emitted from the emission surface within the perimeter of the insert; and at least one passage extending from a first opening in the electrode body to a second opening in the end face, the second opening located adjacent the bore and positioned between the edge and the perimeter.

8. The electrode of claim 7 wherein the emission surface of the insert is coplanar with the end face of the second end.

9. The electrode of claim 7 wherein the insert is entirely disposed within the bore.

10. The electrode of claim 7 wherein the insert is formed of a high thermionic emissivity material.

11. The electrode of claim 10 wherein the high thermionic emissivity material comprises hafnium.

12. An electrode for a plasma arc torch, the electrode comprising:

an electrode body having a first end and a second end, the second end of the electrode body having an end face;

a bore disposed in the second end;

an insert disposed at least partially within the bore and formed of hafnium, such that during operation of the plasma arc torch at least a portion of the insert becomes molten and a plasma arc is emitted from the insert; and at least one electrode gas flow means formed in the electrode body to provide an electrode gas flow that surrounds the insert during operation of the plasma arc torch through an opening between a perimeter of the insert and an edge defined by the end face, thereby extending the life of the insert by reducing a consumption of the hafnium.

13. The electrode of claim 12 wherein the electrode gas comprises a non-oxidizing gas.

14. The non-oxidizing gas of claim 13 comprising nitrogen, argon, hydrogen, helium, or hydrocarbon fuels.

15. A method for operating an electrode of a plasma arc torch, the electrode comprising a body extending from a first end to a second end, the second end having an end face that defines an edge, and an insert formed of hafnium and having an emissive surface disposed at the second end, wherein during operation of the plasma arc torch at least a portion of the emissive surface becomes molten and is ejected due to use over time, the improvement comprising:

directing an electrode gas flow through at least one passage formed in the body, the at least one passage extending from a first opening in the body to a second opening in the end face, the second opening located between the emissive surface and the edge such that the electrode gas flow envelops the insert as the electrode gas flow exits the second opening, the electrode gas flow reducing the swirl strength of a second gas flow in a region of a plasma arc emission to reduce a consumption of the molten emissive surface during use.

16. The method of claim 15 wherein the electrode gas comprises a non-oxidizing gas.

17. The non-oxidizing gas of claim 16 comprising nitrogen, argon, hydrogen, helium, or hydrocarbon fuels.

18. The method of claim 15 wherein the insert is ejected due to use over time and the electrode gas flow that surrounds the insert reduces the emissive material ejected by reducing the swirl strength of a plasma gas flow.

* * * * *